US012631729B2

(12) United States Patent
Kubota et al.

(10) Patent No.: US 12,631,729 B2
(45) Date of Patent: May 19, 2026

(54) SENSOR SYSTEM AND SENSOR UNIT

(71) Applicant: KOITO MANUFACTURING CO., LTD., Tokyo (JP)

(72) Inventors: Akinobu Kubota, Shizuoka (JP); Taishi Hachiya, Shizuoka (JP); Masaaki Sato, Shizuoka (JP); Kazuhiro Suzuki, Shizuoka (JP); Toshihisa Hayami, Shizuoka (JP); Yusuke Totsuka, Shizuoka (JP); Masayuki Miwa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 1078 days.

(21) Appl. No.: 17/767,292

(22) PCT Filed: Oct. 21, 2020

(86) PCT No.: PCT/JP2020/039578
§ 371 (c)(1),
(2) Date: Apr. 7, 2022

(87) PCT Pub. No.: WO2021/079911
PCT Pub. Date: Apr. 29, 2021

(65) Prior Publication Data
US 2022/0390568 A1     Dec. 8, 2022

(30) Foreign Application Priority Data

Oct. 23, 2019    (JP) ................................ 2019-192595
Oct. 23, 2019    (JP) ................................ 2019-192596
(Continued)

(51) Int. Cl.
G01S 7/481        (2006.01)
B60S 1/46         (2006.01)
(Continued)

(52) U.S. Cl.
CPC .............. *G01S 7/4814* (2013.01); *B60S 1/46* (2013.01); *B60S 1/54* (2013.01); *B60S 1/56* (2013.01);
(Continued)

(58) Field of Classification Search
None
See application file for complete search history.

(56) References Cited

U.S. PATENT DOCUMENTS

| | | | |
|---|---|---|---|
| 10,059,280 B2 * | 8/2018 | Cooper ..................... | B60S 1/54 |
| 2014/0232869 A1 * | 8/2014 | May ..................... | H04N 23/811 |
| | | | 348/148 |

(Continued)

FOREIGN PATENT DOCUMENTS

| | | |
|---|---|---|
| CN | 108583453 A | 9/2018 |
| FR | 3056524 A1 | 3/2018 |

(Continued)

OTHER PUBLICATIONS

Search Report (PCT/ISA/210) issued Dec. 22, 2020 by the International Searching Authority in International Patent Application No. PCT/JP2020/039578.
(Continued)

*Primary Examiner* — Ryan Crockett
(74) *Attorney, Agent, or Firm* — Sughrue Mion, PLLC

(57) ABSTRACT

A sensor system to be mounted on a vehicle includes a LiDAR, a camera, a housing that accommodates the LiDAR and the camera and a cleaner that is attached to the housing and has at least one nozzle configured to clean a first cleaning target surface corresponding to the LiDAR and a second cleaning target surface corresponding to the camera at the same time using a cleaning medium.

20 Claims, 30 Drawing Sheets

(30) Foreign Application Priority Data

| | | |
|---|---|---|
| Oct. 23, 2019 | (JP) ................................ | 2019-192597 |
| Oct. 23, 2019 | (JP) ................................ | 2019-192598 |
| Oct. 28, 2019 | (JP) ................................ | 2019-195180 |
| Nov. 1, 2019 | (JP) ................................ | 2019-199532 |
| Nov. 1, 2019 | (JP) ................................ | 2019-199533 |

(51) Int. Cl.

| | |
|---|---|
| *B60S 1/54* | (2006.01) |
| *B60S 1/56* | (2006.01) |
| *G01S 7/4865* | (2020.01) |
| *G01S 17/10* | (2020.01) |
| *G01S 17/89* | (2020.01) |
| *G01S 17/931* | (2020.01) |
| *G02B 27/00* | (2006.01) |

(52) U.S. Cl.

CPC ............ *G01S 7/4865* (2013.01); *G01S 17/10* (2013.01); *G01S 17/89* (2013.01); *G01S 17/931* (2020.01); *G02B 27/0006* (2013.01)

(56) References Cited

U.S. PATENT DOCUMENTS

| | | | |
|---|---|---|---|
| 2017/0182980 A1* | 6/2017 | Davies ....................... | B05B 9/04 |
| 2018/0009418 A1 | 1/2018 | Newman | |
| 2018/0045826 A1* | 2/2018 | Kasaba .................... | G01S 17/42 |
| 2018/0304862 A1 | 10/2018 | Picot et al. | |
| 2019/0003895 A1* | 1/2019 | Krishnan ................ | B60R 11/04 |
| 2019/0047520 A1 | 2/2019 | Giraud et al. | |
| 2019/0077376 A1 | 3/2019 | Baldovino et al. | |
| 2019/0217779 A1 | 7/2019 | Tatara et al. | |
| 2019/0225194 A1 | 7/2019 | Baudoiun et al. | |
| 2019/0278078 A1 | 9/2019 | Krishnan et al. | |
| 2019/0359176 A1* | 11/2019 | Albuquerque ........ | G01S 17/931 |
| 2019/0361436 A1 | 11/2019 | Ueda et al. | |
| 2019/0381975 A1* | 12/2019 | Caillot ................... | G01S 7/4813 |
| 2020/0139939 A1* | 5/2020 | Kubota ..................... | B08B 3/04 |
| 2020/0254979 A1* | 8/2020 | Bretagnol ............. | G03B 29/00 |
| 2020/0300964 A1 | 9/2020 | Kasaba et al. | |
| 2020/0391702 A1* | 12/2020 | Yamauchi ............... | B60Q 9/00 |
| 2021/0116269 A1 | 4/2021 | Gu et al. | |
| 2021/0132231 A1 | 5/2021 | Tanaka et al. | |
| 2021/0197769 A1 | 7/2021 | Shirakura et al. | |

FOREIGN PATENT DOCUMENTS

| | | |
|---|---|---|
| JP | 2009-286216 A | 12/2009 |
| JP | 2016-187990 A | 11/2016 |
| JP | 2017-156177 A | 9/2017 |
| JP | 2018-26305 A | 2/2018 |
| JP | 2018-184023 A | 11/2018 |
| JP | 2018-199483 A | 12/2018 |
| JP | 2019-21200 A | 2/2019 |
| JP | 2019-59463 A | 4/2019 |
| JP | 2019-69723 A | 5/2019 |
| JP | 2019-179287 A | 10/2019 |
| WO | 2018-047594 A1 | 3/2018 |
| WO | 2018-051909 A1 | 3/2018 |
| WO | 2018-155159 A1 | 8/2018 |
| WO | 2018-230558 A1 | 12/2018 |

OTHER PUBLICATIONS

Written Opinion (PCT/ISA/237) issued Dec. 22, 2020 by the International Searching Authority in International Patent Application No. PCT/JP2020/039578.

Office Action issued on Jul. 2, 2024 by the Japan Patent Office in counterpart Japanese Patent Application No. 2021-553497.

Communication issued Oct. 21, 2022 by the European Patent Office for European Patent Application No. 20879607.8.

* cited by examiner

FIG.12

CLEANER CONTROL UNIT

SENSOR SYSTEM AND SENSOR UNIT

CROSS REFERENCE TO RELATED APPLICATIONS

This application is a National Stage of International Application No. PCT/JP2020/039578 filed Oct. 21, 2020, claiming priority based on Japanese Patent Application No. 2019-192595 filed on Oct. 23, 2019, Japanese Patent Application No. 2019-192596 filed on Oct. 23, 2019, Japanese Patent Application No. 2019-192597 filed on Oct. 23, 2019, Japanese Patent Application No. 2019-192598 filed on Oct. 23, 2019, Japanese Patent Application No. 2019-195180 filed on Oct. 28, 2019, Japanese Patent Application No. 2019-199532 filed on Nov. 1, 2019, and Japanese Patent Application No. 2019-199533 filed on Nov. 1, 2019, the entire contents of which are incorporated by reference herein.

TECHNICAL FIELD

The present invention relates to a sensor system and a sensor unit.

BACKGROUND ART

Patent Literature 1 and the like disclose a head lamp cleaner for a vehicle.

In recent years, a vehicle that can be automatically driven has been developed. In order to achieve automatic driving, for example, it is required to acquire information related to the outside of a vehicle using a sensor such as a LiDAR or a camera. Patent Literature 2 discloses a sensor system to be mounted on a vehicle and having a configuration in which a plurality of LiDARs are incorporated in a lamp unit.

CITATION LIST

Patent Literature

Patent Literature 1: JP-A-2016-187990
Patent Literature 2: WO2018/051909

SUMMARY OF INVENTION

Technical Problem

In order to achieve automatic driving, for example, it is required to maintain good sensitivity of a LiDAR or a camera.

An object of the present invention is to provide a sensor system that can effectively clean a unit in which a LiDAR and a camera are integrated.

Further, an object of the present invention is to provide a sensor system that can effectively clean a plurality of sensors.

Furthermore, an object of the present invention is to provide a sensor unit that can maintain cleanliness of a transmission cover.

In addition, it is required to reduce a processing load of a vehicle control unit that controls the entire of an automatic driving vehicle on which various sensors are mounted.

An object of the present invention is to provide a sensor system that can execute a cleaning control on a sensor without increasing a processing load of the vehicle control unit.

In the sensor system disclosed in Patent Literature 2, with respect to which sensors among various sensors are to be combined and mounted, there is room for improvement.

An object of the present invention is to provide a novel sensor unit in which a LiDAR and an infrared camera are integrated.

Further, an object of the present invention is to enable highly accurate sensing in a sensor system including a LiDAR and an infrared camera.

Solution to Problem in order to achieve one of the above objects, a sensor system according to one aspect of the present invention is a sensor system to be mounted on a vehicle.

The sensor system includes:

a LiDAR;

a camera;

a housing that accommodates the LiDAR and the camera; and a cleaner that is attached to the housing and has at least one nozzle capable of cleaning a first cleaning target surface corresponding to the LiDAR and a second cleaning target surface corresponding to the camera at the same time using a cleaning medium.

In order to achieve one of the above objects, a sensor unit according to another aspect of the present invention is a sensor unit to be mounted on a vehicle.

The sensor unit includes:

a LiDAR;

a camera a housing that accommodates the LiDAR and the camera; and a liquid cleaner that has at least one liquid nozzle capable of cleaning a cleaning target surface corresponding to the LiDAR and the camera using a cleaning liquid; and an air cleaner that has at least one air nozzle capable of cleaning the cleaning target surface using air.

The liquid cleaner is attached to an upper portion of the housing.

The air cleaner is attached to a side portion of the housing.

In order to achieve one of the above objects, a sensor system according to another aspect of the present invention is a sensor system to be mounted on a Vehicle.

The sensor system includes:

a first sensor;

a second sensor;

a cleaner that has at least one nozzle capable of cleaning a first cleaning target surface corresponding to the first sensor and a second cleaning target surface corresponding to the second sensor using a cleaning medium; and a cleaner control unit configured to control the cleaner, The cleaner control unit is configured to control the cleaner to clean the first cleaning target surface and the second cleaning target surface based on dirt information detected by at least one of the first sensor and the second sensor.

In order to achieve the above object, a sensor unit according to another aspect of the present invention is a sensor unit to be mounted on a vehicle.

The sensor unit includes:

a sensor configured to acquire external information of the vehicle;

a housing that accommodates the sensor; and a transmission cover that is provided in a manner of covering an opening of the housing and configured to transmit light emitted from the sensor or light incident on the sensor.

The transmission cover is formed in a manner of being recessed from an opening end of the housing toward a central portion of the housing.

In order to achieve one of the above objects, a sensor system according to another aspect of the present invention is a sensor system to be mounted on a vehicle.

The sensor system includes:

a sensor;

a cleaner that has at least one nozzle capable of cleaning a cleaning target surface of the sensor using a cleaning medium;

a sensor control unit configured to control the sensor; and a cleaner control unit configured to control the cleaner.

The sensor control unit transmits a dirt signal generated based on information detected by the sensor to the cleaner control unit without passing through a vehicle control unit that controls the entire vehicle.

In order to achieve one of the above objects, a sensor unit according to another aspect of the present invention is a sensor unit to be mounted on a vehicle.

The sensor unit includes:

a LiDAR;

an infrared camera; and a housing that accommodates the LiDAR and the infrared camera.

In order to achieve one of the above objects, a sensor system according to another aspect of the present invention is a sensor system to be mounted on a vehicle.

The sensor system includes:

a LiDAR;

an infrared camera; and a control unit configured to control the LiDAR and the infrared camera.

The control unit is configured to generate distance image data by using distance information that is related to an object around the vehicle and is acquired by the LiDAR to complement data of the object acquired by the infrared camera.

Advantageous Effects of Invention

According to the present invention, it is possible to provide a sensor system that can effectively clean a unit in which a LiDAR and a camera are integrated.

In addition, according to the present invention, it is possible to provide a sensor system that can effectively clean a plurality of sensors.

In addition, according to the present invention, it is possible to provide a sensor unit that can maintain the cleanliness of a transmission cover.

In addition, according to the present invention, it is possible to provide a sensor system that can execute a cleaning control on a sensor without increasing a processing load of a vehicle control unit.

In addition, according to the present invention, it is possible to provide a novel sensor unit in which a LiDAR and an infrared camera are integrated.

In addition, according to the present invention, it is possible to enable highly accurate sensing in a sensor system including a LiDAR and an infrared camera.

BRIEF DESCRIPTION OF RENDERINGS

FIG. 12 is a transverse cross sectional view showing the sensor unit shown in FIG. 10.

FIG. 24 is a diagram showing a situation in which four different objects are present at different positions in front of a vehicle.

DESCRIPTION OF EMBODIMENTS

Figure 1:
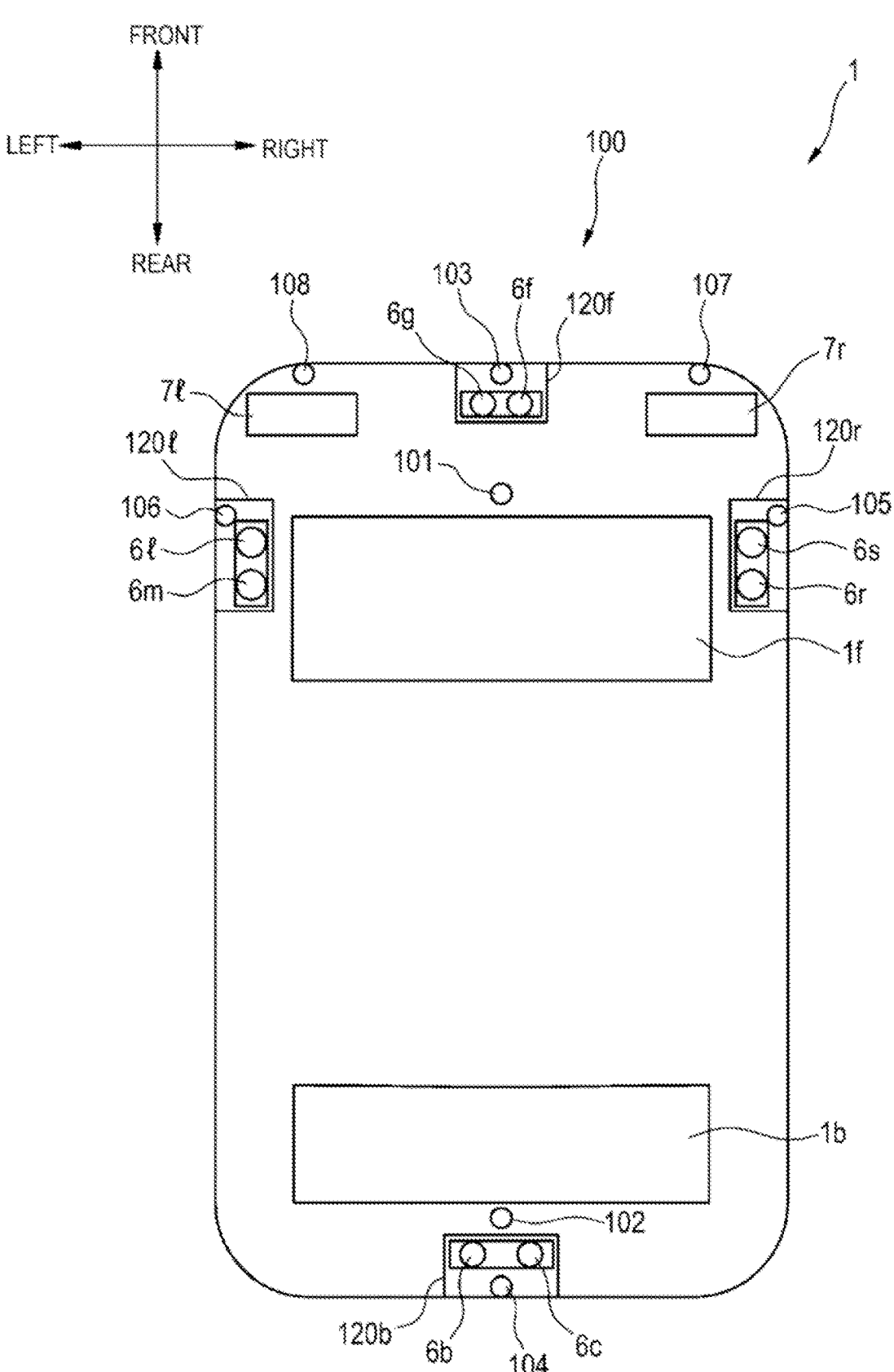
FIG. 1 is a top view showing a vehicle equipped with a sensor system according to a first embodiment.

Hereinafter, embodiments of the present invention will be described with reference to the drawings. Members having the same reference numerals as those already described in the description of an embodiment will be omitted for the convenience of description. In addition, dimensions of members shown in the drawings may be different from actual dimensions thereof for the convenience of description.

In the description of an embodiment of the present invention (hereinafter, referred to as "the present embodiment"), a "left-right direction", a "front-rear direction", and an "upper-lower direction" are appropriately described for the convenience of description. These directions are relative directions set for a vehicle 1 shown in FIG. 1. Here, the "upper-lower direction" is a direction including an "upper direction" and a "lower direction". The "front-rear direction" is a direction including a "front direction" and a "rear direction". The "left-right direction" is a direction including a "left direction" and a "right direction".

Figure 2:
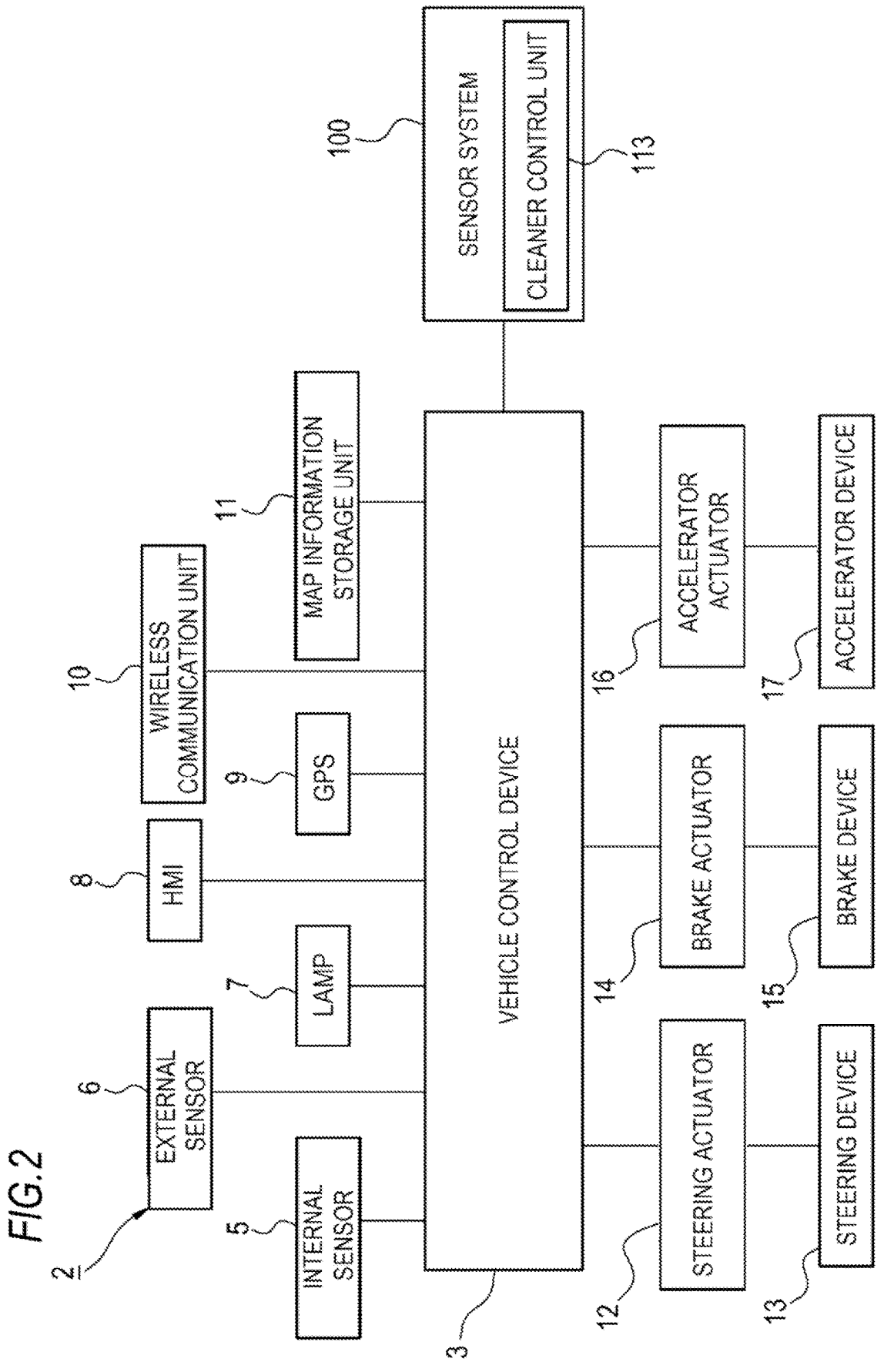
FIG. 2 is a block diagram showing a vehicle system in which the sensor system showing in FIG. 1 is incorporated.

FIG. 1 is a top view showing a vehicle 1 on which a sensor system 100 according to the present embodiment is mounted. FIG. 2 is a block diagram showing a vehicle system 2 in which the sensor system 100 is incorporated. The vehicle 1 includes the sensor system 100. The vehicle 1 is an automobile that can travel in an automatic driving mode in the present embodiment.

First, the vehicle system 2 of the vehicle 1 will be described with reference to FIG. 2.

As shown in FIG. 2, the vehicle system 2 includes a vehicle control unit 3, an internal sensor 5, an external sensor 6, a lamp 7, a human machine interface (HMI) 8, a global positioning system (GPS) 9, a wireless communication unit 10, and a map information storage unit 11. The vehicle system 2 further includes a steering actuator 12, a steering device 13, a brake actuator 14, a brake device 15, an accelerator actuator 16, and an accelerator device 17. The sensor system 100 including a cleaner control unit 113 is communicably connected to the vehicle control unit 3 of the vehicle system 2.

The vehicle control unit 3 is implemented by an electronic control unit (ECU). The vehicle control unit 3 includes a processor such as a central processing unit (CPU), a read only memory (ROM) that stores various vehicle control programs, and a random access memory (RAM) that temporarily stores various kinds of vehicle control data. The processor loads a program specified from the various vehicle control programs stored in the ROM onto the RAM and executes various processings in cooperation with the RAM. The vehicle control unit 3 controls traveling of the vehicle 1.

The internal sensor 5 is a sensor that can acquire information about an own vehicle. The internal sensor 5 is, for example, at least one of an acceleration sensor, a speed sensor, a vehicle wheel speed sensor, a gyro sensor, or the like. The internal sensor 5 is configured to acquire information about the own vehicle including a traveling state of the vehicle 1 and output the information to the vehicle control unit 3. The internal sensor 5 may include a seating sensor that detects whether a driver sits on a driver seat, a face orientation sensor that detects an orientation of the face of the driver, a human sensor that detects whether there is a person in the vehicle, and the like.

The external sensor 6 is a sensor that can acquire information about the outside of the own vehicle. The external sensor is, for example, at least one of a camera, a radar, a LiDAR, and the like. The external sensor 6 acquires information about the outside of the own vehicle including a surrounding environment (another vehicle, a pedestrian, a road shape, a traffic sign, an obstacle, and the like) of the vehicle 1, and outputs the information to the vehicle control unit 3. Alternatively, the external sensor 6 may include a weather sensor that detects a weather condition, an illuminance sensor that detects illuminance of the surrounding environment of the vehicle 1, or the like.

The camera is, for example, a camera including an imaging element such as a charge-coupled device (CCD) or a complementary MOS (CMOS). The camera is a camera that detects visible light or an infrared camera that detects infrared rays.

The radar is a millimeter-wave radar, a microwave radar, a laser radar, and the like.

The LiDAR is an abbreviation for light detection and ranging or laser imaging detection and ranging. In general, the LiDAR is a sensor that emits invisible light to a front side of the LiDAR and acquires information such as a distance to an object, a shape of the object, a material of the object, and a color of the object based on emitted light and returned light.

The lamp 7 is at least one of a head lamp and a position lamp provided at a front portion of the vehicle 1, a rear combination lamp provided at a rear portion of the vehicle 1, a turn signal lamp provided at a front portion or a side portion of the vehicle, various lamps for notifying a pedestrian or a driver of another vehicle of a situation of the own vehicle, and the like.

The HMI 8 includes an input unit that receives an input operation from a driver and an output unit that outputs traveling information and the like to the driver. The input unit includes a steering wheel, an accelerator pedal, a brake pedal, a driving mode changeover switch that switches driving modes of the vehicle 1, and the like. The output unit is a display that displays various kinds of traveling information.

The GPS 9 is configured to acquire current position information of the vehicle 1 and output the acquired current position information to the vehicle control unit 3. The wireless communication unit 10 is configured to receive traveling information of another vehicle around the vehicle 1 from the another vehicle and transmit traveling information of the vehicle 1 to the another vehicle (vehicle-to-vehicle communication). The wireless communication unit 10 is configured to receive infrastructure information from an infrastructure facility such as traffic lights or a sign lamp and transmit traveling information about the vehicle 1 to the infrastructure facility (road-to-vehicle communication). The map information storage unit 11 is an external storage device such as a hard disk drive that stores map information, and the map information storage unit 11 is configured to output the map information to the vehicle control unit 3.

When the vehicle 1 travels in an automatic driving mode, the vehicle control unit 3 automatically generates at least one of a steering control signal, an accelerator control signal, and a brake control signal based on traveling state information, surrounding environment information, current position information, map information, and the like. The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal. In this manner, traveling of the vehicle 1 is automatically controlled by the vehicle system 2 in the automatic driving mode.

On the other hand, when the vehicle 1 travels in a manual driving mode, the vehicle control unit 3 generates a steering control signal, an accelerator control signal, and a brake control signal in accordance with a manual operation of the driver on an accelerator pedal, a brake pedal, and a steering wheel. In this manner, since the steering control signal, the accelerator control signal, and the brake control signal are generated by a manual operation of the driver in the manual driving mode, the traveling of the vehicle 1 is controlled by the driver.

Next, driving modes of the vehicle 1 will be described. The driving modes include an automatic driving mode and a manual driving mode. The automatic driving mode includes a fully automatic driving mode, an advanced driving support mode, and a driving support mode. In the fully automatic driving mode, the vehicle system 2 automatically executes all traveling controls including a steering control, brake control, and an accelerator control, and a driver cannot drive the vehicle 1. In the advanced driving support mode, the vehicle system 2 automatically executes all traveling controls including a steering control, a brake control, and an accelerator control, and the driver can drive the vehicle 1 but does not drive the vehicle 1. In the driving support mode, the vehicle system 2 automatically executes a part of the traveling controls including a steering control, a brake control, and an accelerator control, and the driver drives the vehicle 1 under the driving support of the vehicle system 2. On the other hand, in the manual driving mode, the vehicle system 2 does not automatically execute the traveling controls, and the driver drives the vehicle 1 without the driving support of the vehicle system 2.

The driving modes of the vehicle 1 may be switched by operating the driving mode changeover switch. In this case, the vehicle control unit 3 switches the driving modes of the vehicle 1 among the four driving modes the fully automatic driving mode, the advanced driving support mode, the driving support mode, and the manual driving mode) according to an operation of the driver performed on the driving mode changeover switch. The driving modes of the vehicle 1 may be automatically switched based on information about a travelable section where an automatic driving vehicle can travel or a traveling prohibited section where traveling of the automatic driving vehicle is prohibited, or information about an external weather condition. In this case, the vehicle control unit 3 switches the driving modes of the vehicle 1 based on the information described above. Further, the driving modes of the vehicle 1 may be automatically switched by using a seating sensor, a face orientation sensor, and the like. In this case, the vehicle control unit 3 switches the driving modes of the vehicle 1 based on an output signal from the seating sensor or the face orientation sensor.

Returning to FIG. 1, the vehicle 1 includes a front LiDAR 6f, a rear LiDAR 6b, a right LiDAR 6r, a left LiDAR 6l, a front camera 6g, a rear camera 6c, a right camera 6s, and a left camera 6m, as the external sensor 6. The front LiDAR 6f and the front camera 6g are configured to acquire information about a front side of the vehicle 1. The rear LiDAR 6b and the rear camera 6c are configured to acquire information about a rear side of the vehicle 1. The right LiDAR 6r and the right camera 6s are configured to acquire information about a right side of the vehicle 1. The left LiDAR 6l and the left camera 6m are configured to acquire information about a left side of the vehicle 1.

Although the front LiDAR 6f and the front camera 6g are provided at a front portion of the vehicle 1, the rear LiDAR 6b and the rear camera 6c are provided art a rear portion of the vehicle 1, the right LiDAR 6r and the right camera 6s are provided at a right portion of the vehicle 1, and the left LiDAR 6l and the left camera 6m are provided at a left portion of the vehicle 1 in the example shown in FIG. 1, the present invention is not limited to this example. For example, the front LiDAR, the front camera, the rear LiDAR, the rear camera, the right LiDAR, the right camera, the left LiDAR, and the left camera may be collectively disposed on a ceiling of the vehicle 1.

The vehicle 1 includes a right head lamp 7r and a left head lamp 7l as the lamp 7. The right head lamp 7r is provided at a right portion of a front portion of the vehicle 1, and the left head lamp 7l is provided at a left portion of the front portion of the vehicle 1. The right head lamp 7r is provided to the right of the left head lamp 7l.

The vehicle 1 includes a front window 1f and a rear window 1b.

The sensor system 100 mounted on the vehicle 1 includes a cleaner unit 110 that removes foreign matters such as water droplets, mud, and dust adhering to an object or prevents foreign matters from adhering to the object. For example, the cleaner unit 110 includes a front window washer (hereinafter, referred to as a front WW) 101 capable of cleaning the front window 1f and a rear window washer (hereinafter, referred to as a rear WW) 102 capable of cleaning the rear window 1b in the present embodiment. The cleaner unit 110 includes a front sensor cleaner (hereinafter, referred to as a front SC) 103 capable of cleaning the front LiDAR 6f and the front camera 6g, and a rear sensor cleaner (hereinafter, referred to as a rear SC) 104 capable of cleaning the rear LiDAR 6b and the rear camera 6c. The cleaner unit 110 includes a right sensor cleaner (hereinafter, referred to as a right SC) 105 capable of cleaning the right LiDAR 6r and the right camera 6s, and a left sensor cleaner (hereinafter, referred to as a left SC) 106 capable of cleaning the left LiDAR 6l and the left camera 6m. The cleaner unit 110 includes a right head lamp cleaner (hereinafter, referred to as a right HC) 107 capable of cleaning the right head lamp 7r and a left head lamp cleaner (hereinafter, referred to as a left NC) 108 capable of cleaning the left head lamp 7l.

Each of the cleaners 101 to 108 has one or more nozzles, and ejects a cleaning medium such as a cleaning liquid or air from the nozzles toward an object.

Figure 3:
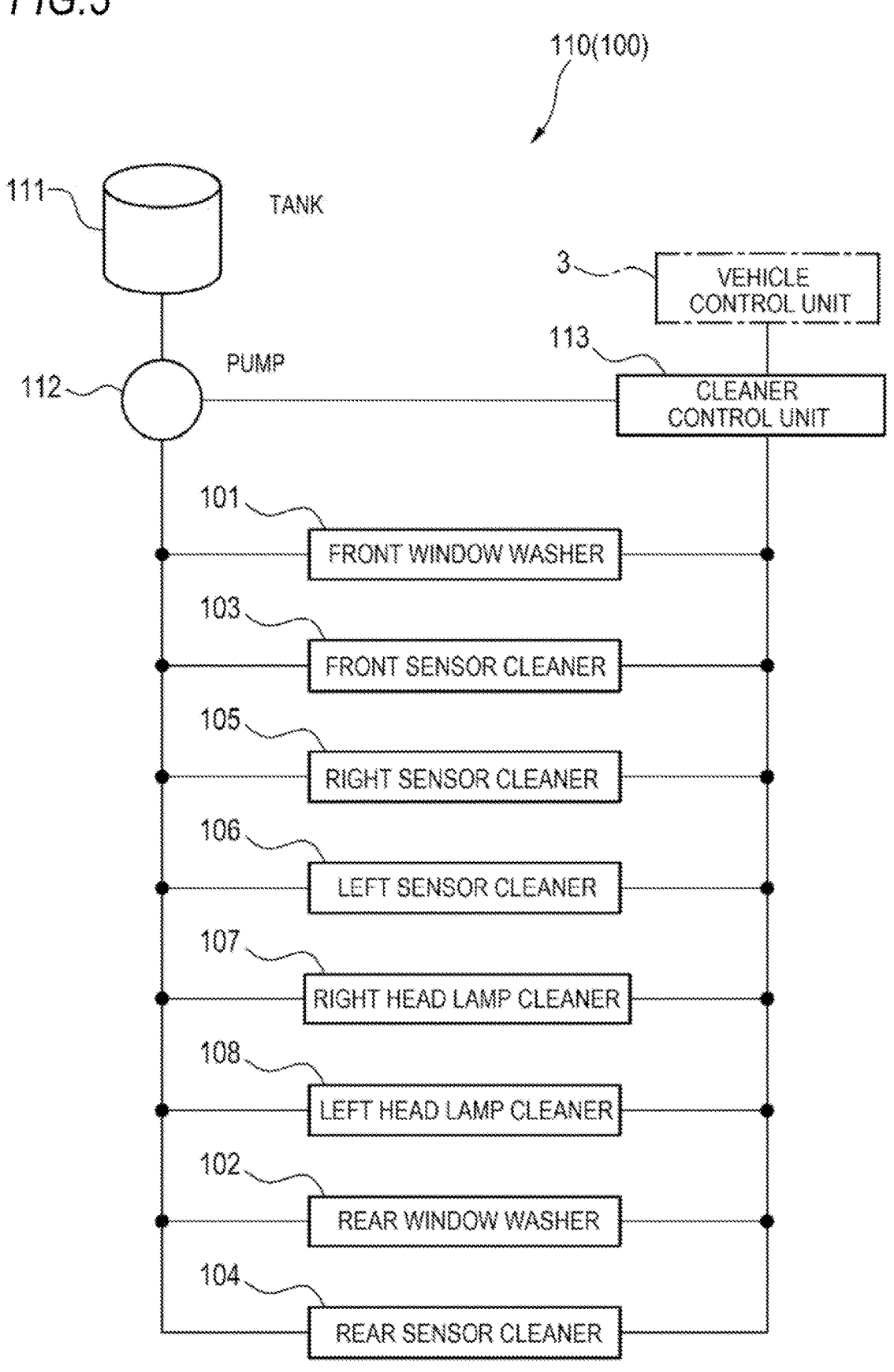
FIG. 3 is a block diagram showing the sensor system shown in FIG. 1.

FIG. 3 is a block diagram showing the cleaner unit 110 provided in the sensor system 100. The cleaner unit 110 includes a tank 111, a pump 112, and the cleaner control unit 113, in addition to the cleaners 101 to 108.

The front WW 101, the rear WW 102, the front SC 103, the rear SC 104, the right SC 105, the left SC 106, the right HC 107, and the left HC 108 are connected to the tank 111 via the pump 112. The pump 112 sends a cleaning liquid stored in the tank 111 to the front WW 101, the rear WW 102, the front SC 103, the rear SC 104, the right SC 105, the left SC 106, the right HC 107, and the left HC 108.

Each of the cleaners 101 to 108 is provided with an actuator (not shown) that opens the nozzle to eject a cleaning liquid to an object to be cleaned. The actuator provided in each of the cleaners 101 to 108 is electrically connected to the cleaner control unit 113. The cleaner control unit 113 is electrically connected to the pump 112 and the vehicle control unit 3. Operations of the cleaners 101 to 108, the pump 112, and the like are controlled by the cleaner control unit 113. Information acquired by the cleaner control unit 113 and information acquired by the vehicle control unit 3 are exchanged between the cleaner control unit 113 and the vehicle control unit 3. Although the vehicle control unit 3 and the cleaner control unit 113 are provided as separate bodies in the present embodiment, the vehicle control unit 3 and the cleaner control unit 113 may be provided as an integrated body. In this regard, the vehicle control unit 3 and the cleaner control unit 113 may be configured by a single electronic control unit.

Figure 4:
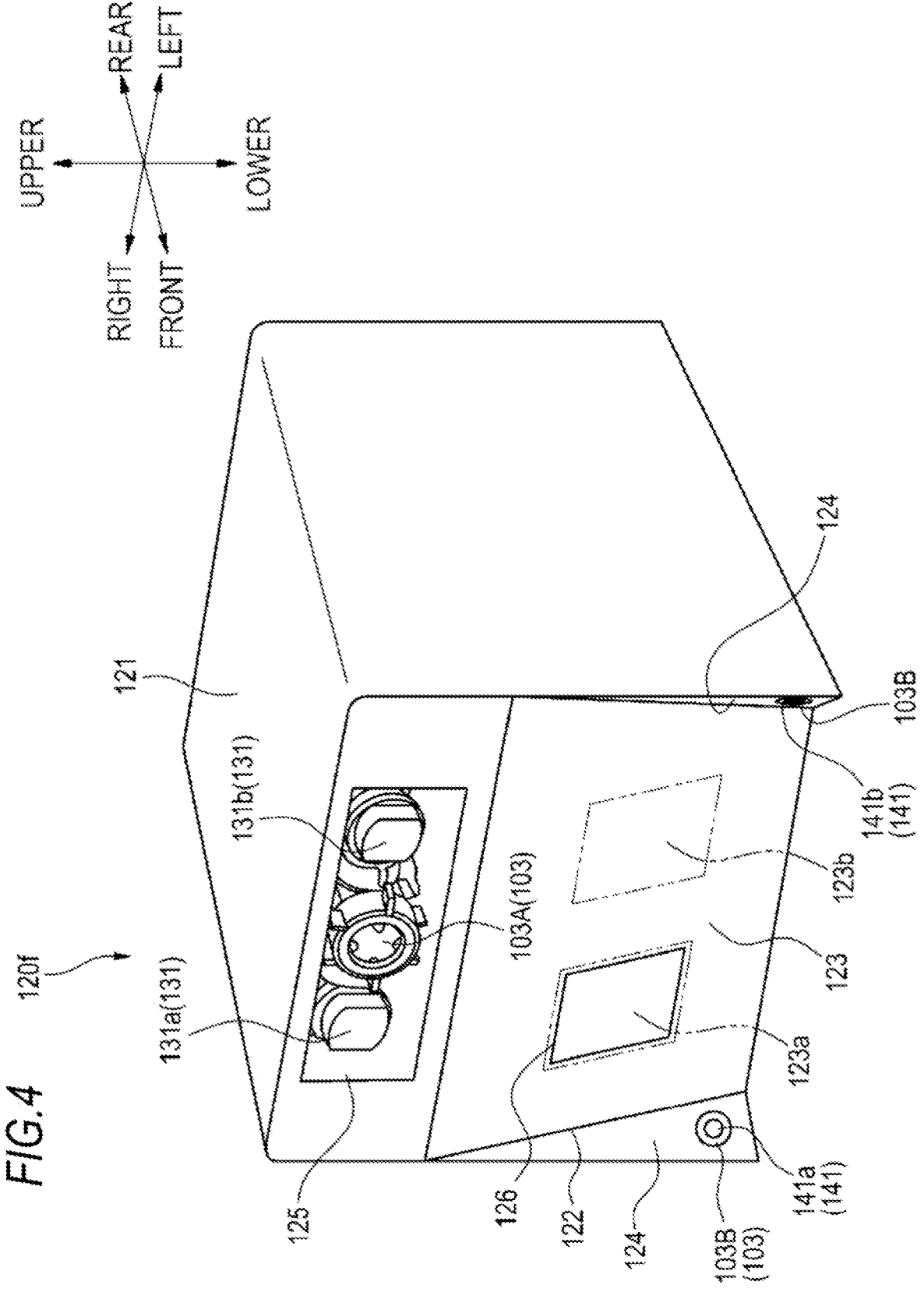
FIG. 4 is a perspective view showing a sensor unit provided in the sensor system shown in FIG. 1.
Figure 5:
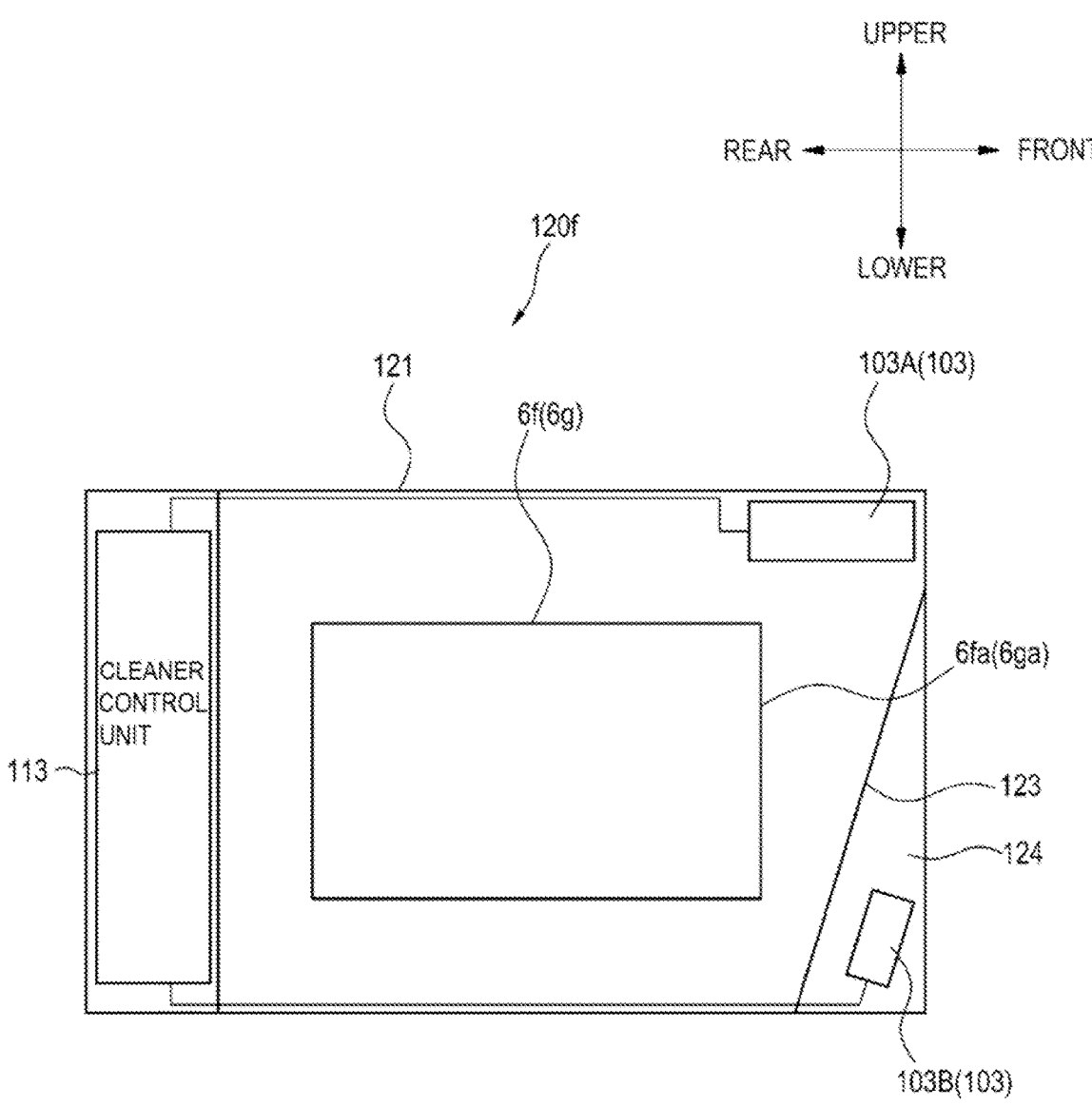
FIG. 5 is a schematic diagram showing an internal configuration of the sensor unit shown in FIG. 4.

FIG. 4 is a perspective view showing a configuration of a sensor unit in which a cleaner and a sensor such as a LiDAR or a camera are integrated. FIG. 5 is a schematic diagram showing an internal configuration of the sensor unit. Among a plurality of sensor units provided in the sensor system 100, a front sensor unit 120*f* provided at a front portion of the vehicle 1 will be described in the example shown in FIGS. 4 and 5. As shown in FIG. 1, the vehicle 1 includes a rear sensor unit 120*b* provided at a rear portion of the vehicle 1, a right sensor unit 120*r* provided at a right portion, and a left sensor unit 120*l* provided at a left portion, in addition to the front sensor unit 120*f* provided at the front portion of the vehicle 1. Since the rear sensor unit 120*b*, the right sensor unit 120*r*, and the left sensor unit 120*l* have the same configuration as the front sensor unit 120*f*, description thereof will be omitted.

As shown in FIGS. 4 and 5, the front sensor unit 120*f* includes a housing 121, the front LiDAR 6*f*, the front camera 6*g*, a liquid cleaner 103A, an air cleaner 103B, and the cleaner control unit 113. The liquid cleaner 103A and the air cleaner 103B are cleaners constituting the front SC 103.

The housing 121 is made of, for example, synthetic resin, and is formed into a substantially box shape. Although not shown in FIG. 4, the front LiDAR 6*f* and the front camera 6*g* are accommodated in the housing 121. For example, the front LiDAR 6*f* and the front camera 6*g* are accommodated in the housing 121 side by side in the left-right direction in a manner in which a light emission surface 6*fa* and a lens 6*ga* shown in FIG. 5 face a front side. As shown in FIG. 1, the front LiDAR 6*f* is disposed at a right side of the vehicle 1, and the front camera 6*g* is disposed at a left side of the vehicle 1 in the present example. An arrangement relationship between the front LiDAR 6*f* and the front camera 6*g* may be opposite to that in the present example. For example, an opening 122 of the housing 121 is formed to have a size including at least front surface areas of the front LiDAR 6*f* and the front camera 6*g* that are accommodated in the housing 121.

A transmission cover 123 is attached to the opening 122 of the housing 121 in a manner of covering the opening 122 without a gap. The transmission cover 123 is formed of, for example, a transparent or translucent synthetic resin. The transmission cover 123 is attached in a manner of covering the opening 122 so as to cover the front surface areas of the front LiDAR 6*f* and the front camera 6*g* that are accommodated in the housing 121. The transmission cover 123 is attached in a manner of covering the front surface areas of the front LiDAR 6*f* and the front camera 6*g*, and thus is configured as a cleaning target surface corresponding to the front LiDAR 6*f* and the front camera 6*g* in the front sensor unit 120*f*.

The transmission cover 123 is attached in a manner of extending in a direction inclined relative to a plane orthogonal to an optical axis of the front LiDAR 6*f* accommodated in the housing 121. The transmission cover 123 is attached in a manner of being inclined so as to come close toward an inner side of the housing 121 from the upper direction toward the lower direction. For example, the transmission cover 123 is inclined toward a back side (rear side) of the housing 121 from the upper direction toward the lower direction. The transmission cover 123 is formed in a manner in which a width in the left-right direction becomes narrower from the upper direction to the lower direction (in a manner of being separated from a side wall of the housing 121).

An inclined direction of the transmission cover 123 is not limited to the inclined direction described above. As long as the transmission cover 123 is inclined relative to a plane orthogonal to the optical axis of the front LiDAR 6*f*, for example, the transmission cover 123 may be inclined in a manner of coming close toward the inner side of the housing 121 from the right (left) direction toward the left (right) direction.

The housing 121 has protruding portions 124 that protrude outward (forward) from a surface of the transmission cover 123 in the left-right direction of the transmission cover 123 by attaching the transmission cover 123 in an inclined manner as described above. In the present embodiment, since the transmission cover 123 comes close toward the inner side of the housing 121 from the upper direction toward the lower direction, triangular pyramid-shaped protruding portion 124 is formed in each of the right direction and the left direction of the transmission cover 123. In a modification in which the transmission cover 123 comes close toward the inner side of the housing 121 from the right (left) direction toward the left (right) direction, the protruding portion 124 is formed, for example, only in the left (right) direction (or the protruding portion 124 is formed in each of the upper direction and the lower direction) of the transmission cover 123.

The liquid cleaner 103A is a cleaner capable of cleaning a cleaning target surface corresponding to the front LiDAR 6*f* and the front camera 6*g*, that is, the transmission cover 123 that covers front surface areas of the front LiDAR 6*f* and the front camera 6*g* using a cleaning liquid. Similarly, the air cleaner 103B is a cleaner capable of cleaning the transmission cover 123 that covers the front surface areas of the front LiDAR 6*f* and the front camera 6*g* using air.

The liquid cleaner 103A includes a liquid nozzle 131 capable of ejecting a cleaning liquid. For example, the liquid cleaner 103A includes a first liquid nozzle 131*a* (an example of a first nozzle) that ejects a cleaning liquid toward a first area 123*a* of the transmission cover 123 through which light emitted from the front LiDAR 6*f* passes, and a second liquid nozzle 131*b* (an example of a second nozzle) that ejects a cleaning liquid toward a second area 123*b* of the transmission cover 123 that covers a lens of the front camera 6*g*. For example, the liquid cleaner 103A is attached to an upper portion in the housing 121. The liquid cleaner 103A is accommodated in an opening 125 provided above the transmission cover 123 of the housing 121. The first liquid nozzle 131*a* and the second liquid nozzle 131*b* are pop-up nozzles that can protrude from the opening 125. The liquid cleaner 103A can clean the first area 123*a* and the second area 123*b* at the same time.

The air cleaner 103B includes an air nozzle 141 capable of ejecting air. For example, the air cleaner 103B is attached to each of the left and right protruding portions 124. The air cleaner 103B at a right side includes a first air nozzle 141a that ejects air toward the first area 123a corresponding to the front LiDAR 6f. The air cleaner 103B at a left side includes a second air nozzle 141b that ejects air toward the second area 123b corresponding to the front camera 6g. Each air cleaner 103B is attached to a side portion in the housing 121.

The first area 123a and the second area 123b in FIG. 4 are examples described as a range of a cleaning target surface, and the present invention is not limited thereto. An actual cleaning target surface may be the entire area related to acquisition of information by the front LiDAR 6f and the front camera 6g, and may be two areas that are wider than the first area 123a and the second area 123b shown in FIG. 4 and overlap with each other.

A filter 126 that shields visible light is provided in the first area 123a of the transmission cover 123, that is, in an area through which light emitted from the front LiDAR 6f passes. The filter 126 can shield visible light that is about to enter the first area 123a from the outside. The filter 126 is attached to, for example, a back surface side of the first area 123a. For example, the filter 126 may be deposited on the transmission cover 123.

The cleaner control unit 113 is integrally attached to the housing 121. In the present embodiment, the cleaner control unit 113 is attached to a rear portion in the housing 121.

The cleaner control unit 113 controls operations of the liquid cleaner 103A and the air cleaner 103B. The cleaner control unit 113 controls the liquid cleaner 103A such that the first liquid nozzle 131a and the second liquid nozzle 131b of the liquid cleaner 103A can clean the first area 123a and the second area 123b at the same time. The cleaner control unit 113 controls the air cleaner 103B such that the first air nozzle 141a and the second air nozzle 141b of the air cleaner 103B can clean the first area 123a and the second area 123b at the same time.

Figure 6:
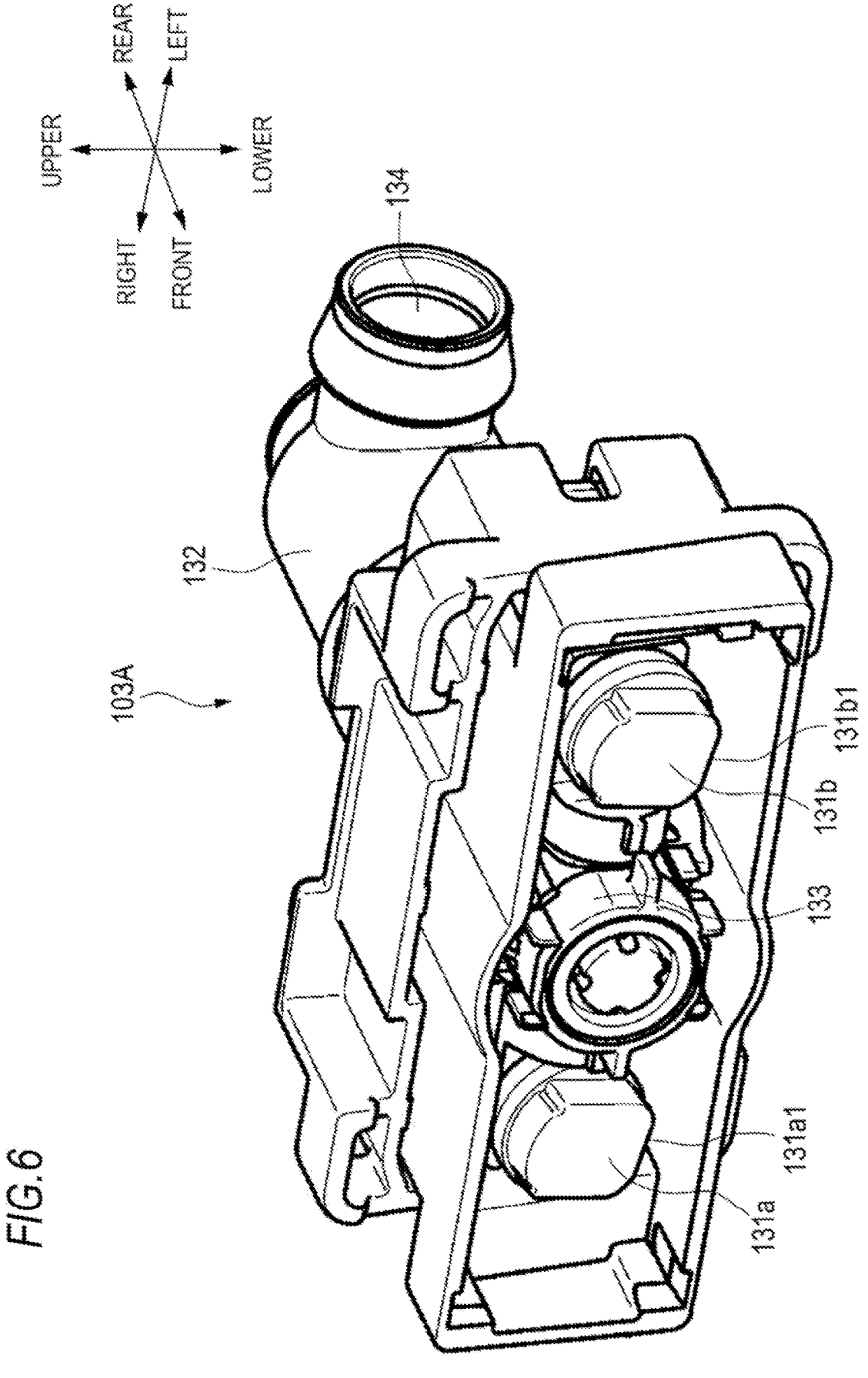
FIG. 6 is a perspective view showing a liquid cleaner provided in the sensor system shown in FIG. 1.

FIG. 6 is a perspective view showing the liquid cleaner 103A. As shown in FIG. 6, the liquid cleaner 103A includes a cylinder 132, a piston 133, and the liquid nozzle 131 (the first liquid nozzle 131a and the second liquid nozzle 131b).

The cylinder 132 is formed into a cylindrical shape, and a coupling portion 134 is provided at a rear side of the cylinder 132. A hose (not shown) for supplying a cleaning liquid is connected to the coupling portion 134. The hose is connected to the pump 112 that supplies a cleaning liquid from the tank 111.

The piston 133 is slidably accommodated in the cylinder 132. The piston 133 is movable forward and backward in the front-rear direction along a central axis of the cylinder 132.

The first liquid nozzle 131a and the second liquid nozzle 131b are provided in a pair at the left and right sides in the vicinity of a tip end of the piston 133, and have the same configuration. A first ejection port 131a1 capable of ejecting a cleaning liquid toward the first area 123a of the transmission cover 123 is provided on a lower surface of the first liquid nozzle 131a. A second ejection port 131b1 capable of ejecting a cleaning liquid toward the second area 123b of the transmission cover 123 is provided on a lower surface of the second liquid nozzle 131b. The second liquid nozzles 131a and 131b function as, for example, a fluidics nozzle (swing spray nozzle). The fluidics nozzle is a nozzle that changes an ejection direction of a fluid by causing fluids flowing inside the nozzle to interfere with each other.

The number of the liquid nozzles 131 is not limited to two, and for example, only one liquid nozzle 131 may be provided at a tip end portion of the piston 133, or three or more liquid nozzles 131 may be provided at the tip end portion of the piston 133.

When the pump 112 is driven by a drive signal transmitted from the cleaner control unit 113, the cleaning liquid is supplied from the tank 111 to the cylinder 132 via the hose. The cleaning liquid flows into the cylinder 132, thereby moving the piston 133 forward along the central axis of the cylinder 132, and the piston 133 protrudes from the opening 125 of the housing 121. That is, the first liquid nozzle 131a and the second liquid nozzle 131b provided at the tip end of the piston 133 pop up in a forward direction. The cleaning liquid that passed through the piston 133 is supplied into the liquid nozzles 131a and 131b, and is ejected from the ejection ports 131a1 and 131b1 of the liquid nozzles 131a and 131b toward the first area 123a and the second area 123b.

When the driving of the pump 112 is stopped by a stop signal transmitted from the cleaner control unit 113, the supply of the cleaning liquid from the tank 111 to the cylinder 132 is stopped. As a result, the ejection of the cleaning liquid from the liquid nozzles 131a and 131b is completed, and the piston 133 moves rearward along the central axis of the cylinder 132, so that the liquid nozzles 131a and 131b are accommodated in the opening 125 of the housing 121.

Although the liquid cleaner 103A of a pop-up nozzle is used in the present embodiment, the present invention is not limited to this example. A fixed liquid cleaner in which a nozzle does not pop up may be used.

Figure 7:
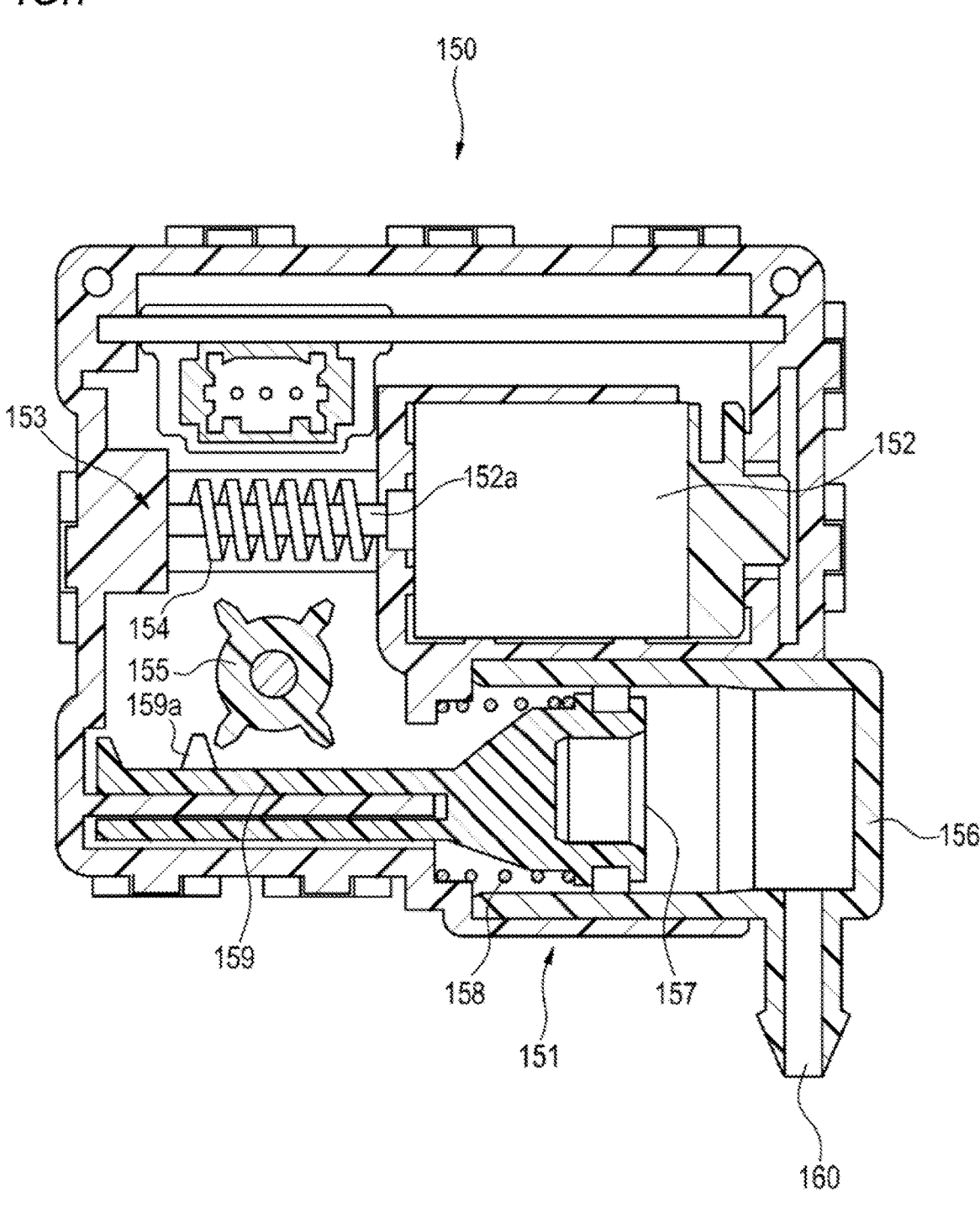
FIG. 7 is a diagram showing a high-pressure air generation unit of an air cleaner provided in the sensor system shown in FIG. 1.

FIG. 7 is a diagram showing a high-pressure air generation unit 150 of the air cleaner 103B. The air cleaner 103B includes the high-pressure air generation unit 150 that generates high-pressure air ejected from the air nozzle 141. The high-pressure air generation unit 150 includes a pump 151 that compresses air to generate high-pressure air, a motor 152 that drives the pump 151 by a rotational movement, and a worm mechanism 153 that transmits the rotational movement of the motor 152 to the pump 151.

The worm mechanism 153 includes a worm 154 that is fixed to a rotation shaft 152a of the motor 152 and is rotated accompanying with the rotation of the motor 152, a worm wheel (not shown) that is meshed with the worm 154 and is rotated accompanying with the rotation of the worm 154, and a pinion 155 that is coaxially supported with the worm wheel.

The pump 151 includes a cylinder 156 into which air flows, a piston 157 that sends the air to the outside, a biasing spring 158 that biases the piston 157, a rack 159 that extends continuously from the piston 157, and an ejection port 160 from which the air is ejected.

The piston 157 can reciprocate in a longitudinal direction of the cylinder 156. The biasing spring 158 biases the piston 157 in a direction in which the air in the cylinder 156 is sent to the outside. When the piston 157 is moved by a biasing force of the biasing spring 158, the air in the cylinder 156 is compressed to become high-pressure air and is ejected from the ejection port 160. The rack 159 is provided with a rack tooth 159a. The rack 159 reciprocates in the longitudinal direction of the cylinder 156 together with the piston 157. The rack tooth 159a can be meshed with the pinion 155 of the worm mechanism 153. When the pinion 155 is rotated, the pinion 155 meshes with the rack tooth 159a, and the rack 159 is moved in a direction in which air (outside air) flows into the cylinder 156. Accompanying with the movement of the rack 159, the piston 157 is moved together with the rack 159 against the biasing force of the biasing spring 158.

The high-pressure air generation unit 150 is configured such that an ejection port 160 of the pump 151 that ejects high-pressure air is coupled to a coupling portion (not shown) of the air nozzle 141 via a hose (not shown). When the motor 152 is driven by a drive signal transmitted from the cleaner control unit 113, the piston 157 moves inside the cylinder 156, and high-pressure air is supplied from the ejection port 160 of the pump 151 to the air nozzle 141 via the hose. As a result, high-pressure air is ejected from the air nozzle 141 toward the first area 123a and the second area 123b of the transmission cover 123.

The high-pressure air generation unit 150 may be disposed, for example, at a predetermined location inside a vehicle body panel, or may be disposed inside the housing 121.

Although the air cleaner 103B including the high-pressure air generation unit 150 of a piston type is used in the present embodiment, the present invention is not limited to this example. For example, an air cleaner provided with a non-positive displacement blower may be adopted. Examples of the non-positive displacement blower include a propeller fan, a sirocco fan, a turbo fan, and a mixed flow fan. An air blowing mechanism of the air cleaner may adopt a positive displacement fan of a reciprocating type, a screw type, a roots type, a vane type, or the like. The air blowing mechanism may be referred to as a blower, a pump, or the like, in addition to a fan.

Next, an operation example of the sensor system 100 according to the present embodiment will be described with reference to FIGS. 8 and 9.

Figure 8:
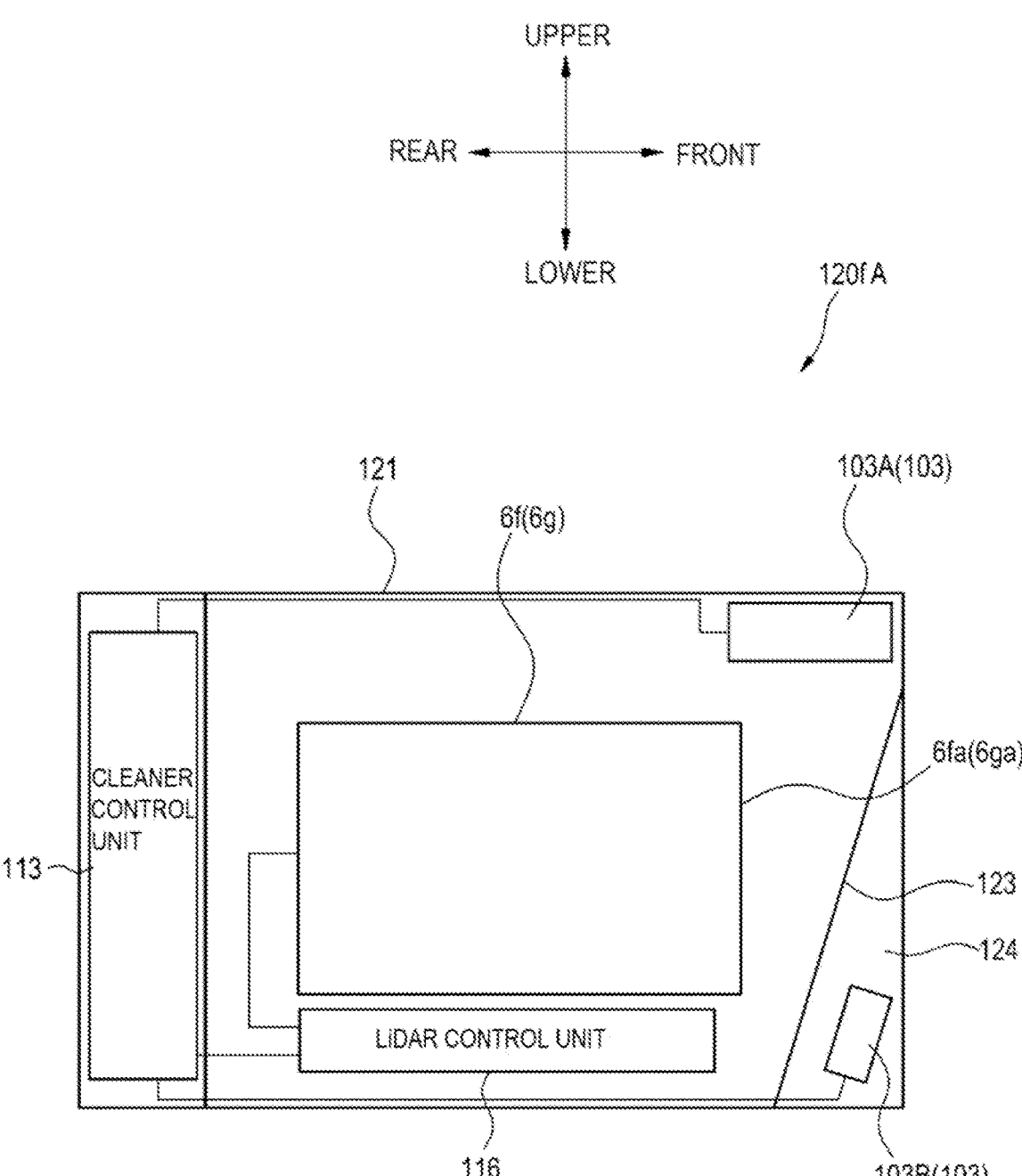
FIG. 8 is a schematic diagram showing an internal configuration of a sensor unit provided in a sensor system according to a modification of the first embodiment.

FIG. 8 is a schematic diagram showing an internal configuration of a sensor unit 120fA according to a modification of the first embodiment. FIG. 9 is a flowchart showing an operation example of the sensor system 100.

The operation of the LiDAR 6f is controlled by a LiDAR control unit 116 (an example of a sensor control unit) that is electrically connected to the LiDAR 6f. In the present example, the LiDAR control unit 116 is provided below the LiDAR 6f in the housing 121, as shown in FIG. 8. Although not shown, the LiDAR control unit 116 is also electrically connected to the vehicle control unit 3. Information acquired by the LiDAR control unit 116 and information acquired by the vehicle control unit 3 are exchanged between the LiDAR control unit 116 and the vehicle control unit 3. Although the vehicle control unit 3 and the LiDAR control unit 116 are provided as separate bodies in the present embodiment, the vehicle control unit 3 and the LiDAR control unit 116 may be provided as an integrated body. In this regard, the vehicle control unit 3 and the LiDAR control unit 116 may be implemented by a single electronic control unit.

The LiDAR control unit 116 is also electrically connected to the cleaner control unit 113. Information acquired by the LiDAR control unit 116 and information acquired by the cleaner control unit 113 are exchanged between the LiDAR control unit 116 and the cleaner control unit 113. Specifically, a dirt signal detected based on point cloud data acquired by the LiDAR control unit 116 is transmitted to the cleaner control unit 113.

Figure 9:
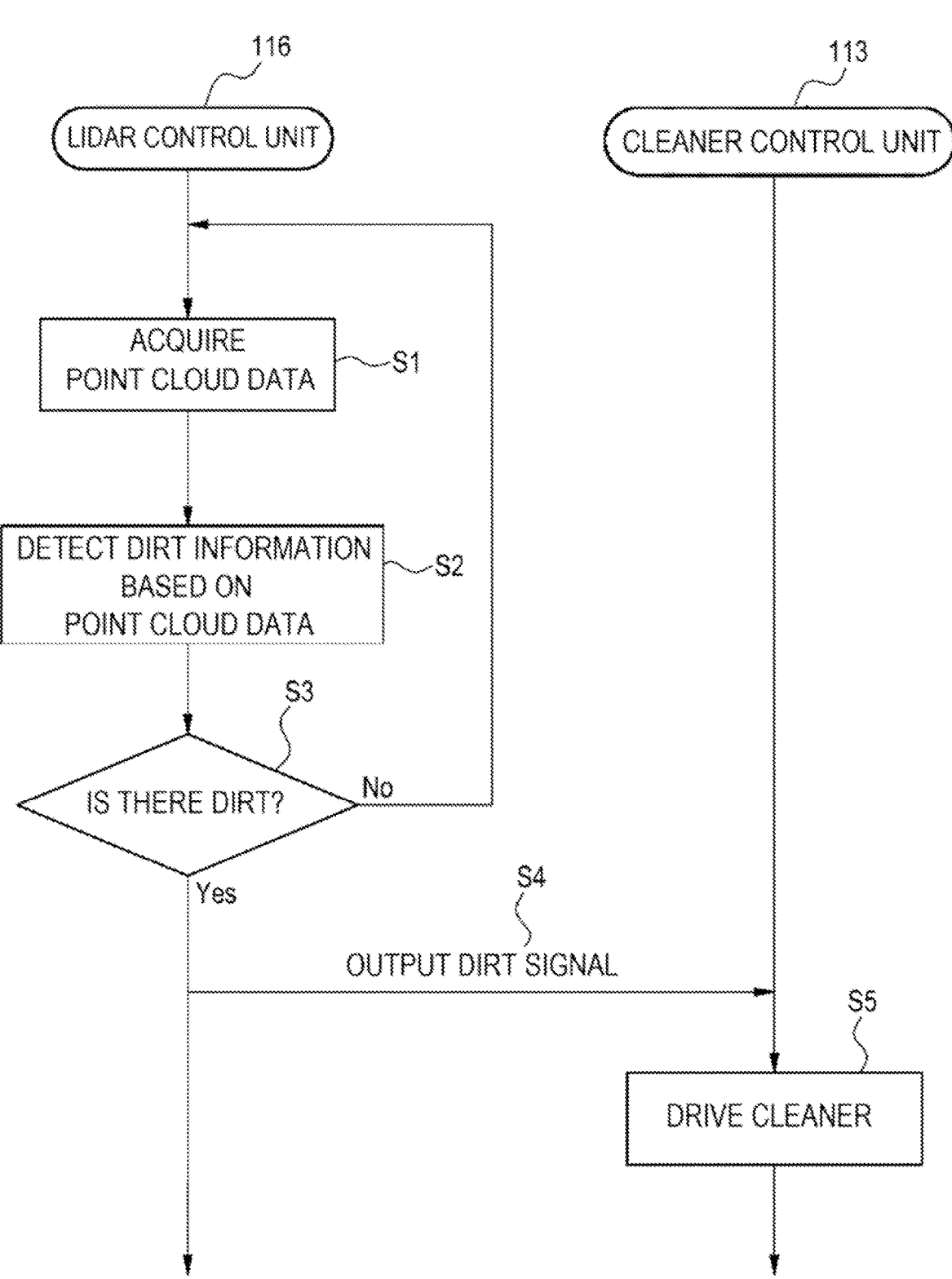
FIG. 9 is a flowchart showing an operation example of the sensor system shown in FIG. 8.

First, in step S1, the LiDAR control unit 116 receives reflected light of light emitted from the LiDAR 6f so as to acquire three-dimensional mapping data (hereinafter, referred to as point cloud data), as shown in FIG. 9. That is, the LiDAR control unit 116 acquires the point cloud data indicating a surrounding environment of the vehicle 1 at a predetermined frame rate.

Next, in step S2, the LiDAR control unit 116 detects dirt information of the transmission cover 123 based on the acquired point cloud data. For example, the LiDAR control unit 116 detects missing of the acquired point cloud data. The missing of die point cloud data is detected based on, for example, an intensity of light received by the LiDAR 6f. Specifically, among the point cloud data, data having a received light intensity equal to or less than a predetermined threshold and/or equal to or more than a predetermined threshold is determined as "missing (or noise)".

Next, in step S3, the LiDAR control unit 116 determines whether dirt adheres to the transmission cover 123 based on the dirt information detected in step S2. For example, when the LiDAR control unit 116 detects the missing of the point cloud data, the LiDAR control unit 116 determines whether a degree of the missing (a missing degree) is equal to or larger than a predetermined threshold. The missing degree may be defined based on, for example, the number of data missing portions in the entire piece of point cloud data, or may be defined based on a size of a missing area.

When it is determined in step S3 that the missing degree of the point cloud data is not equal to or larger than the predetermined threshold (No in step S3), the LiDAR control unit 116 returns the processing to step S1.

On the other hand, when it is determined in step S3 that the missing degree of the point cloud data is equal to or larger than the predetermined threshold (Yes in step S3), the LiDAR control unit 116 transmits a dirt signal to the cleaner control unit 113 in step S4.

When the dirt signal is transmitted from the LiDAR control unit 116 to the cleaner control unit 113, the cleaner control unit 113 uses the received dirt signal as a trigger to drive the pump 112 of the liquid cleaner 103A and the pump 151 of the air cleaner 1033 in step S5. As a result, the cleaning liquid is ejected from the liquid nozzle 131 and the high-pressure air is ejected from the air nozzle 141 to the first area 123a and the second area 121b of the transmission cover 123. Thereafter, the processing is ended.

As described above, the sensor unit 120f according to the present embodiment includes the front LiDAR 6f and the front camera 6g, the housing 121, the liquid cleaner 103A at the upper portion in the housing 121, and the air cleaner 103B at the side portion in the housing 121. The liquid cleaner 103A and the air cleaner 103B can clean the transmission cover 123 (a cleaning target surface) that covers front sides of the front LiDAR 6f and the front camera 6g. According to this configuration, it is possible to effectively clean the sensor unit 120f in which the front LiDAR 6f and the front camera 6g are integrated.

When light emitted from a LiDAR is reflected by a transmission cover, an outer lens, or the like, the reflected light may be incident on the LiDAR 6f and become stray light. In contrast, according to the sensor unit 120f in the present embodiment, the transmission cover 123 is attached in a manner of extending in an inclined direction relative to a plane orthogonal to the optical axis of the front LiDAR 6f accommodated in the housing 121. Therefore, it is possible to reduce the light that is emitted from the front LiDAR 6f, is reflected by the transmission cover 123, and is incident on the front LiDAR 6f. Therefore, it is possible to prevent the reflected light from affecting the measurement of the front LiDAR 6f.

In the present embodiment, the transmission cover 123 is attached in a manner of being inclined toward the inner side of the housing 121 from the upper direction to the lower direction. Therefore, it is possible to prevent external light (in particular, sunlight) from being incident on the transmission cover 123 from above and outside the housing 121.

Therefore, for example, it is possible to prevent external light such as sunlight from affecting the front LiDAR 6f and the front camera 6g.

The housing 121 of the sensor unit 120f has the protruding portions 124 at the left and right sides of the front portion of the housing 121, and the air nozzle 141 of the air cleaner 103B is provided in each of the protruding portions 124. The protruding portion 124 is a portion provided in a manner of protruding outward from a surface of the transmission cover 123 in the left-right direction of the transmission cover 123 that is attached in an inclined manner. Therefore, it is easy to eject the high-pressure air toward the transmission cover 123 that is a cleaning target surface. That is, the air nozzle 141 can be efficiently disposed in the housing 121.

In the present embodiment, the cleaner control unit 113 that controls the liquid cleaner 103A and the air cleaner 103B is integrally attached to the housing 121. As a result, control functions of the liquid cleaner 103A and the air cleaner 103B are also integrated with the sensor unit 120f, so that a load of the vehicle control unit 3 that is a vehicle ECU can be reduced.

According to the sensor unit 120f, the liquid cleaner 103A includes the first liquid nozzle 131a that ejects the cleaning liquid toward the first area 123a through which the light emitted from the front LiDAR 6f passes, and the second liquid nozzle 131b that ejects the cleaning liquid toward the second area 123b corresponding, to the lens of the front camera 6g. Therefore, it is possible to efficiently clean a cleaning target surface corresponding to the front LiDAR 6f and clean a cleaning target surface corresponding to the front camera 6g.

The sensor system 100 including the sensor unit 120f can clean, at the same time, the first area 123a and the second area 123b (cleaning target surfaces) of the transmission cover 123 that covers the front sides of the front LiDAR 6f and the front camera 6g using cleaning media respectively ejected from the first liquid nozzle 131a and the second liquid nozzle 131b of the cleaner 103. According to this configuration, it is possible to effectively clean the sensor system 100 in which the front LiDAR 6f and the front camera 6g are integrated.

In the present embodiment, the filter 126 that shields visible light is provided in the first area 123a of the transmission cover 123 through which the light emitted from the front LiDAR 6f passes. Therefore, the filter 126 can shield visible light that is incident on the first area 123a from the outside, and it is possible to prevent an adverse affect on the sensing of the front LiDAR 6f. Therefore, it is possible to implement the transmission cover 123 having a cleaning target surface suitable for the front LiDAR 6f and a cleaning target surface suitable for the front camera 6g with a simple configuration.

According to the sensor unit 120f, the front LiDAR 6f and the front camera 6g are configured as an integrated unit, so that it is easy to improve positioning accuracy of the liquid cleaner 103A and the air cleaner 103B relative to the front LiDAR 6f and the front camera 6g. When the sensor unit 120f is to be mounted on the vehicle 1, the front LiDAR 6f, the front camera 6g, and the cleaner unit 110 that cleans the front LiDAR 6f and the front camera 6g can be incorporated together, and it is easy to assemble the sensor unit 120f to the vehicle 1.

The sensor system 100 according to the present embodiment includes the LiDAR 6f (an example of a first sensor), the camera 6g (an example of a second sensor), the cleaner 103 that has the nozzle 131 capable of cleaning the first area 123a (an example of a first cleaning target surface) of the transmission cover 123 corresponding to the LiDAR 6f and the second area 123b (an example of a second cleaning target surface) of the transmission cover 123 corresponding to the camera 6g using a cleaning liquid, and the cleaner control unit 113 that controls the cleaner 103. The cleaner control unit 113 controls the cleaner 103 to clean both the first area 123a and the second area 123b of the transmission cover 123 based on the dirt information detected from the point cloud data acquired by the LiDAR 6f. As described above, according to the present embodiment, the cleaning target surfaces of both sensors (the LiDAR 6f and the camera 6g) are cleaned based on detection information of one sensor (file LiDAR 6f in this case) among the plurality of unitized sensors. Accordingly, it is possible to efficiently clean the cleaning target surfaces of the sensor unit 120f in which the LiDAR 6f and the camera 6g are integrated.

In the present embodiment, when the missing degree of the point cloud data acquired by the LiDAR 6f is equal to or larger than a predetermined threshold, the cleaner control unit 113 controls the cleaner 103 to clean both the first area 123a and the second area 123b of the transmission cover 123. Accordingly, it is possible to determine whether the LiDAR 6f and the camera 6g need to be cleaned with a simple configuration.

In the present embodiment, the liquid cleaner 103A includes the first liquid nozzle 131a that ejects the cleaning liquid toward the first area 123a of the transmission cover 123, and the second liquid nozzle 131b that ejects the cleaning liquid toward the second area 123b of the transmission cover 123. The air cleaner 103B includes the first air nozzle 141a that ejects the cleaning liquid toward the first area 123a of the transmission cover 123, and the second air nozzle 141b that ejects the cleaning liquid toward the second area 123b of the transmission cover 123. In this manner, the cleaners 103A and 103B can efficiently clean both the first area 123a corresponding to the LiDAR 6f and the second area 123b corresponding to the camera 6g.

In the present embodiment, the transmission cover 123 is formed in a manner of being inclined toward the inner side of the housing 121 from the upper direction to the lower direction. In this manner, since the transmission cover 123 is formed in a manner of extending in an inclined direction relative to the plane orthogonal to the optical axis of the LiDAR 6f, it is possible to prevent the influence of external light such as light reflected by the transmission cover 123 or sunlight. Therefore, the dirt information detected from the point cloud data acquired by the LiDAR control unit 116 can be detected with high accuracy.

Although both the first area 123a and the second area 123b of the transmission cover 123 are cleaned based on the dirt information detected from the point cloud data acquired by the LiDAR 6f between the LiDAR 6f and the camera 6g accommodated in the sensor unit 120f in the embodiment described above, the present invention is not limited to this example. For example, both the first area 123a and the second area 123b of the transmission cover 123 may be cleaned based on dirt information detected from image data acquired by the camera 6g. According to this configuration, it is also possible to efficiently clean the cleaning target surfaces of the sensor unit 120f in which the LiDAR 6f and the camera 6g are integrated.

Although it is determined whether dirt adheres to the transmission cover 123, that is, whether the transmission cover 123 needs to be cleaned, based on the missing degree of the point cloud data in the embodiment described above, the present invention is not limited to this example. For example, when a distance from the LiDAR 6f to a specific area included in the point cloud data is substantially equal to a distance from the LiDAR 6f to the transmission cover 123 based on distance information calculated from the point cloud data, it may be determined that dirt adheres to the transmission cover 123.

Second Embodiment

Figure 10:
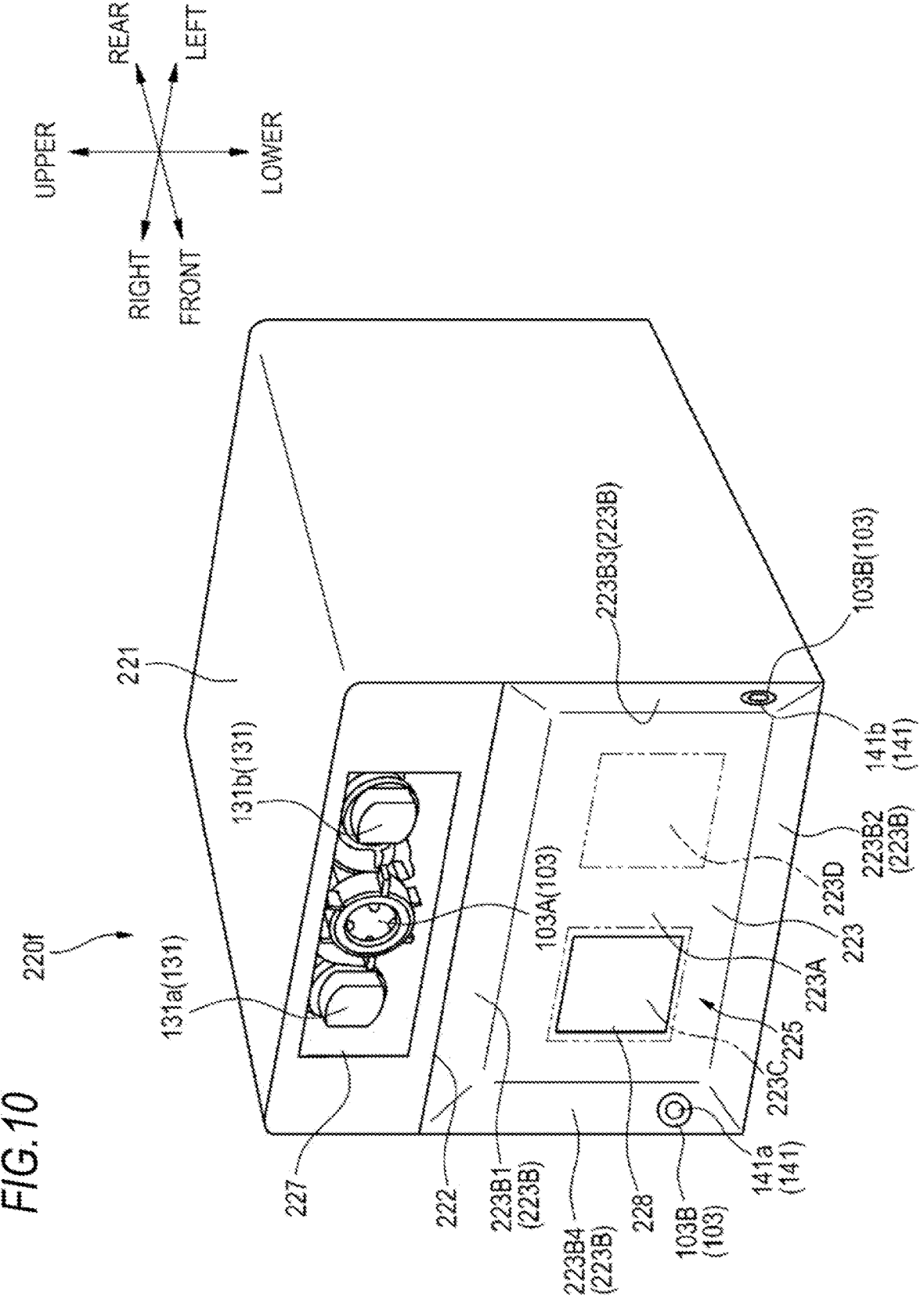
FIG. 10 is a perspective view showing a sensor unit according to a second embodiment.
Figure 11:
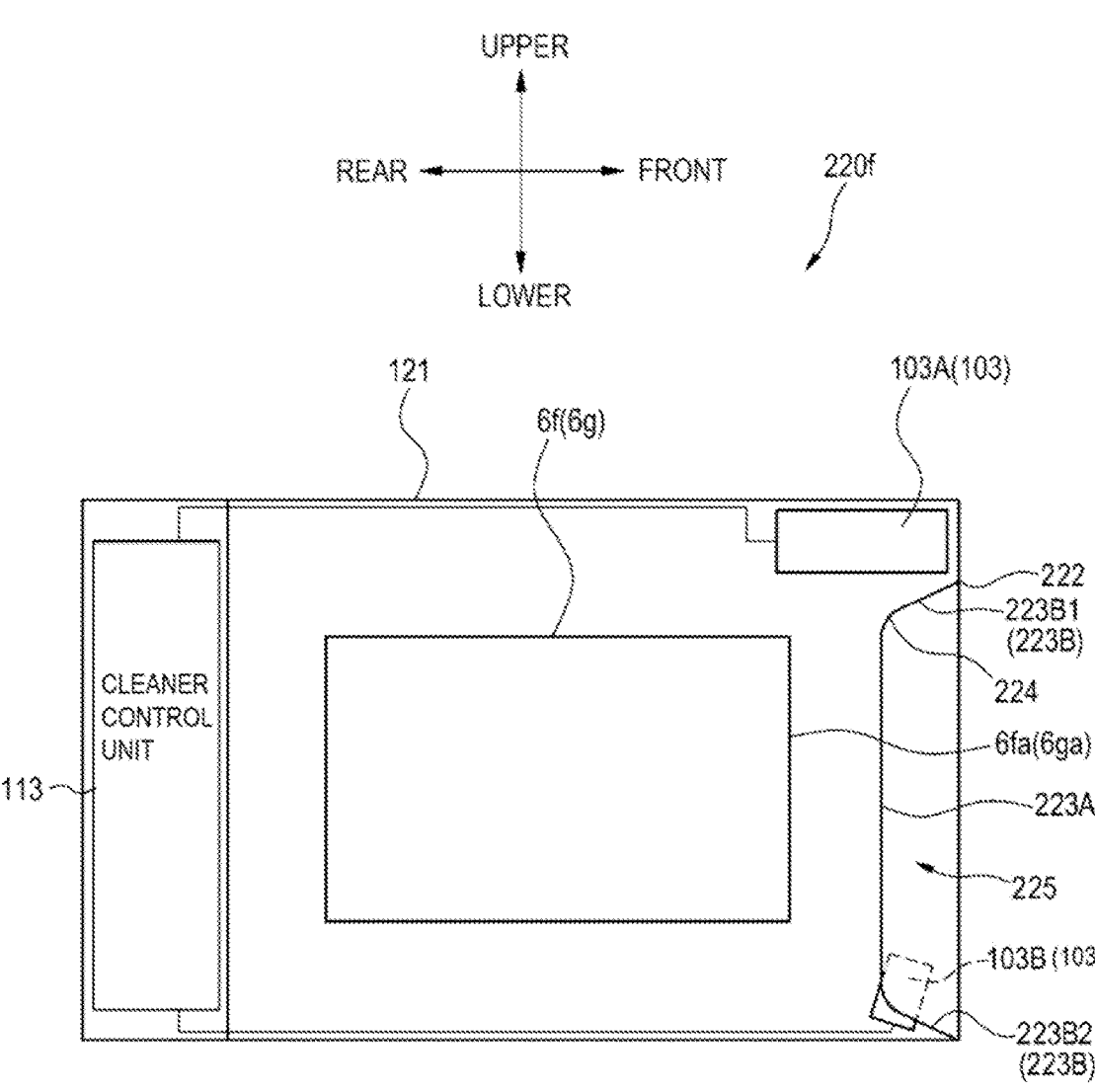
FIG. 11 is a longitudinal cross sectional view showing the sensor unit shown in FIG. 10.
Figure 12:
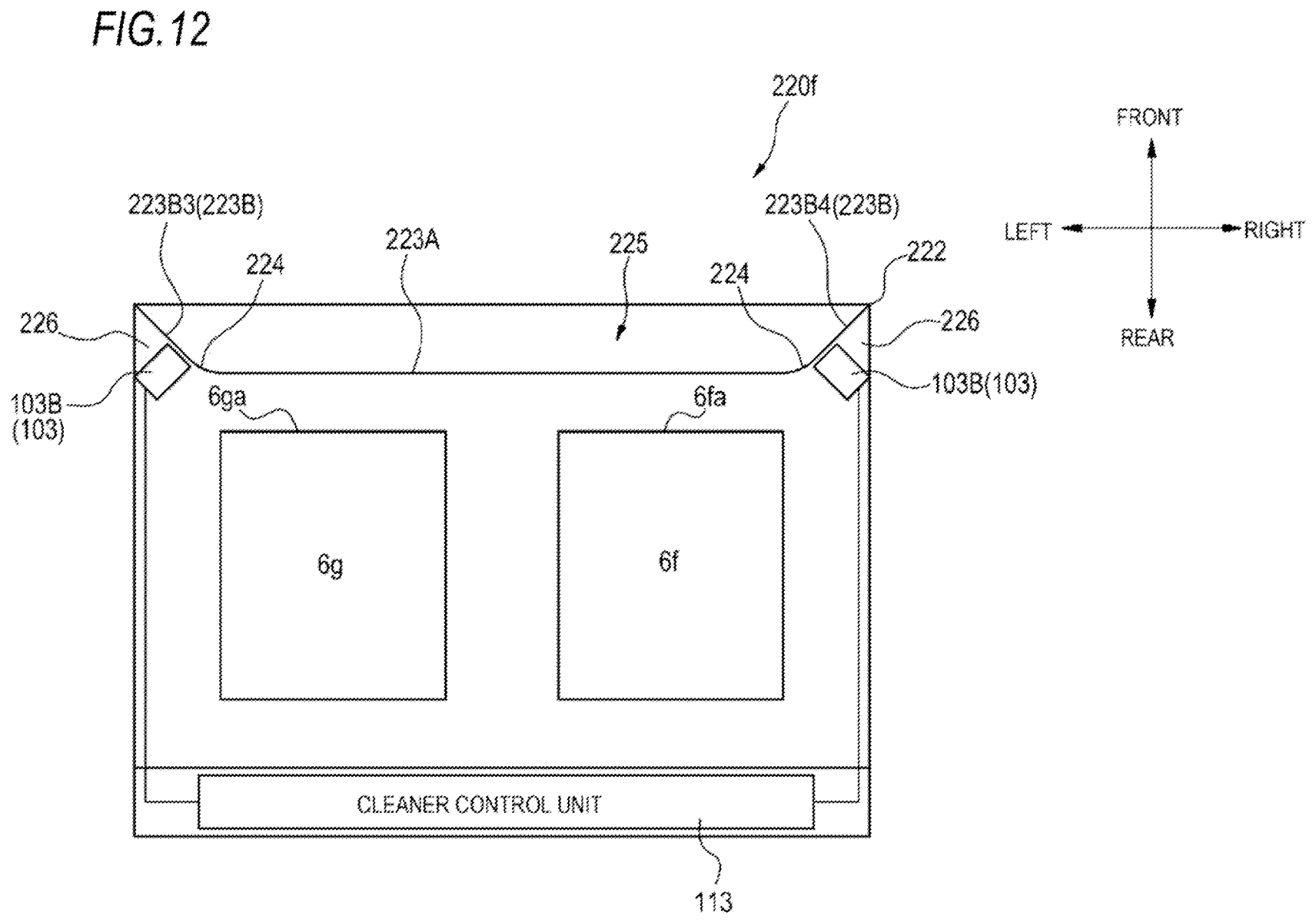

Next, a sensor unit according to a second embodiment will be described with reference to FIGS. 10 to 11 FIG. 10 is a perspective view showing a configuration of a sensor unit in which a cleaner and a sensor such as a LiDAR or a camera are integrated. FIG. 11 is a longitudinal cross sectional view showing an internal structure of the sensor unit. FIG. 12 is a transverse cross sectional view showing the internal structure of the sensor unit. Among a plurality of sensor units provided in a sensor system, a front sensor unit 220f according to the second embodiment provided at a front portion of the vehicle 1 will be described in the example shown in FIGS. 10 to 12.

As shown in FIGS. 10 to 13, the front sensor unit 220f according to the second embodiment includes a housing 221, the front LiDAR 6f, the front camera 6g, the liquid cleaner 103A, the air cleaner 103B, and the cleaner control unit 113. The liquid cleaner 103A and the air cleaner 103B are cleaners constituting the front SC 103.

A transmission cover 223 is provided in a manner of coming close to a back side (rear side) relative to an opening edge of an opening 222 in the housing 221. The transmission cover 223 includes a central flat portion 223A (an example of a central area) provided in a manner of extending, for example, in a direction orthogonal to the optical axis of the front LiDAR 6f accommodated in the housing 221, and an outer peripheral area 223B provided in a manner of extending, for example, in a direction inclined relative to a plane orthogonal to the optical axis of the front LiDAR 6f.

The outer peripheral area 223B is formed in a manner of being inclined into a recessed shape from an opening end of the opening 222 toward a central portion of the opening 222. The outer peripheral area 223B is formed to be continuous with the periphery of the central flat portion 223A. The outer peripheral area 223B includes an upper outer peripheral area 223B1 that is continuous with an upper portion of the central flat portion 223A, a lower outer peripheral area 223B2 that is continuous with a lower portion of the central flat portion 223A, a left outer peripheral area 223B3 that is continuous with a left portion of the central flat portion 223A, and a right outer peripheral area 223B4 that is continuous with a right portion of the central flat portion 223A.

The outer peripheral area 223B of the transmission cover 223 is formed in a manner of coming close to an inner side of the housing 221 from the opening edge of the opening 222 toward the back side. For example, the upper outer peripheral area 223B1 is inclined downward and inward. The lower outer peripheral area 223B2 is inclined upward and inward. The left outer peripheral area 223B3 is inclined toward a right side and an inner side. The right outer peripheral area 223B4 is inclined toward a left side and an inner side. A area continuous from the outer peripheral area 223B to the central flat portion 223A, that is, a boundary area 224 between the outer peripheral area 223B and the central flat portion 223A is formed into, for example, a curved shape. The boundary area 224 may be formed such that an angle formed between a surface of the outer peripheral area 223B and a surface of the central flat portion 223A is an obtuse angle. An inclined surface of each of the outer peripheral areas 223B1 to 223B4 may be formed into a planar shape or may be formed into a curved shape.

The central flat portion 223A of the transmission cover 223 is formed to have an area smaller than an area of the opening 222 of the housing 221. The central flat portion 223A is formed to have a size capable of covering at least front surface areas of the front LiDAR 6f and the front camera 6g that are accommodated in the housing 221. The central flat portion 223A is an area through which the light emitted from the front LiDAR 6f or the light incident on the front LiDAR 6f passes.

With such a configuration, a recessed space 225 is defined in the opening 222 of the housing 221 by the central flat portion 223A and the outer peripheral area 223B on a surface of the transmission cover 223. A space 226 (see FIG. 12) having a substantially triangular prism shape is formed between a left side wall of the housing 221 and the left outer peripheral area 223B3 of the transmission cover 223 due to the inclination of the left outer peripheral area 223B3. Similarly, the space 226 having a substantially triangular prism shape is formed between a right side wall of the housing 221 and the right outer peripheral area 223B4 of the transmission cover 223 due to the inclination of the right outer peripheral area 223B4.

A first area 223C of the transmission cover 223 is an area through which the light emitted from the front LiDAR 6f passes. A second area 223D of the transmission cover 223 is an area that covers the lens of the front camera 6g. The first liquid nozzle 131a (an example of a first nozzle) of the liquid nozzle 131 ejects the cleaning liquid toward, for example, the first area 223C of the transmission cover 223. The second liquid nozzle 131b (an example of a second nozzle) of the liquid nozzle 131 ejects the cleaning liquid toward the second area 223D of the transmission cover 223. The liquid cleaner 103A can clean the first area 223C and the second area 223D at the same time.

The air cleaner 103B at the right side includes the first air nozzle 141a that ejects air toward the first area 223C corresponding to the front LiDAR 6f. The air cleaner 103B at the left side includes the second air nozzle 141b that ejects air toward the second area 223D corresponding to the front camera 6g.

The first area 223C and the second area 223D in FIG. 10 are shown as an example of a range of a cleaning target surface, and the present invention is not limited thereto. An actual cleaning target surface may be the entire area related to acquisition of information by the front LiDAR 6f and the front camera 6g, and may be two areas that are wider than the first area 223C and the second area 223D shown in FIG. 10 and overlap with each other.

A filter 228 that shields visible light is provided in the first area 223C of the transmission cover 223, that is, in an area through which light emitted from the front LiDAR 6f passes. The filter 228 can shield visible light that is about to enter the first area 223C from the outside. The filter 228 is attached to, for example, a back surface side of the first area 223C. For example, the filter 228 may be deposited on the transmission cover 223.

The cleaner control unit 113 is integrally attached to the housing 221. In the present embodiment, the cleaner control unit 113 is attached to a rear portion in the housing 221.

The cleaner control unit 113 controls operations of the liquid cleaner 103A and the air cleaner 103B. The cleaner control unit 113 controls the liquid cleaner 103A such that the first air nozzle 141a and the second air nozzle 141b of the liquid cleaner 103A can clean the first area 223C and the second area 223D at the same time. Further, the cleaner control unit 113 controls the air cleaner 103B such that the first air nozzle 141*a* and the second air nozzle 141*b* of the air cleaner 103B can clean the first area 223C and the second area 223D at the same time.

Figure 13:
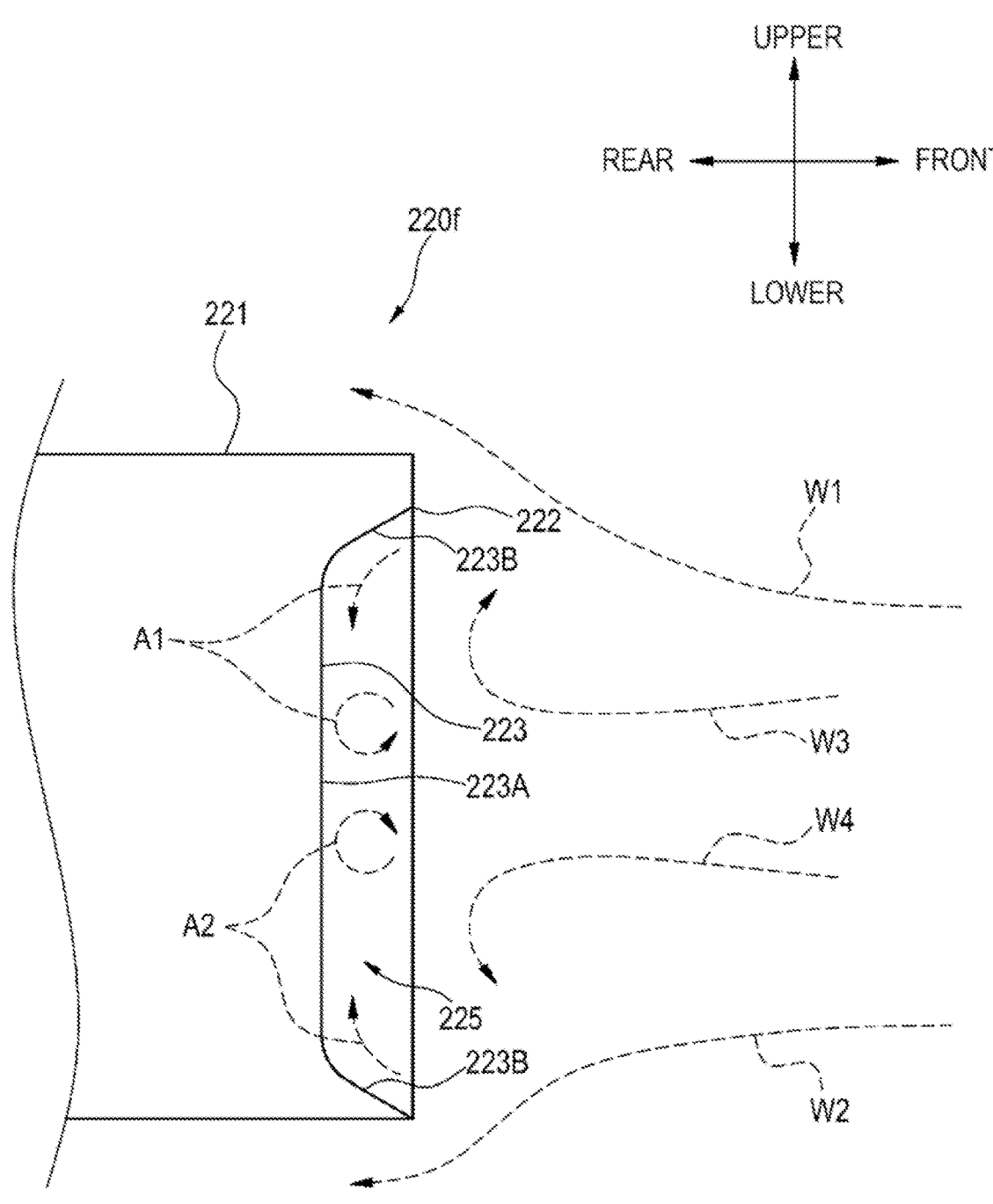
FIG. 13 is a diagram showing a movement of air staying in a space of a transmission cover.

As described above, in the sensor unit 220*f* according to the present embodiment, the transmission cover 223 provided in the opening 222 of the housing 221 is formed in a manner of being recessed rearward from the opening end of the housing 221 toward the central portion. That is, the transmission cover 223 includes the central flat portion 223A that extends in a direction orthogonal to the optical axis of the front LiDAR 6*f* accommodated in the housing 221, and the outer peripheral area 223B that extends in a direction inclined relative to the plane orthogonal to the optical axis of the front LiDAR 6*f*. According to such a configuration, the recessed space 225 is defined in the opening 222 of the housing 221 by the central flat portion 223A and the outer peripheral area 223B on the surface of the transmission cover 223, as shown in FIG. 13. Therefore, for example, even when outside air W1 to W4 is blown toward the sensor unit 220*f* from a front side during traveling of the vehicle 1, the outside air W1 to W4 is less likely to enter the recessed space 225 because air A1 and A2 stays in the recessed space 225 of the transmission cover 223. Since the air A1 and the air A2 stay in the recessed space 225, for example, the outside air W1 blown toward an upper portion of the housing 221 and the outside air W2 blown toward a lower portion of the housing 221 flow to upper and lower outer sides of the housing 221. Since the air A1 and the air A2 stay in the recessed space 225, the outside air W3 and the outside air W4 blown toward the vicinity of the central portion of the housing 221 flow in the upper-lower direction of the housing 221. Therefore, it is possible to prevent dirt such as dust mixed in the outside air W1 to W4 from adhering to the surface of the transmission cover 223. As a result, it is possible to maintain good cleanliness of the transmission cover 223 in the sensor unit 220*f* in which the front LiDAR 6*f* and the front camera 6*g* are integrated.

The sensor unit 220*f* includes the front sensor cleaner 103 that has at least one nozzle 131 capable of cleaning the transmission cover 223 using a cleaning medium. According to this configuration, it is possible to maintain good cleanliness of the transmission cover 223.

The at least one nozzle 131 in the sensor unit 220*f* includes the first liquid nozzle 131*a* that ejects the cleaning liquid toward an area of the transmission cover 223 corresponding to the front LiDAR 6*f*, and the second liquid nozzle 131*b* that ejects the cleaning liquid toward an area of the transmission cover 223 corresponding, to the front camera 6*g*. According to this configuration, it is possible to efficiently clean a cleaning target surface (the first area 223C) of the front LiDAR 6*f* and a cleaning target surface (the second area 223D) of the front camera 6*g*.

In the present embodiment, the filter 228 that shields visible light is provided in the first area 223C of the transmission cover 223 through which the light emitted from the front LiDAR 6*f* passes. Therefore, the filter 228 can shield visible light that is incident on the first area 223C from the outside, and it is possible to prevent the sensing of the front LiDAR 6*f* from being affected by visible light. Therefore, it is possible to provide the transmission cover 223 suitable for sensing of the front LiDAR 6*f*.

In the present embodiment, the cleaner control unit 113 that controls the liquid cleaner 103A and the air cleaner 103B is integrally attached to the housing 221. As a result, control functions of the liquid cleaner 103A and the air cleaner 103B are also integrated with the sensor unit 220*f*, so that a processing load of the vehicle control unit 3 that is a vehicle ECU can be reduced.

Although a configuration of the transmission cover 223 of the sensor unit 220*f* in which the front LiDAR 6*f* and the front camera 6*g* are integrated has been described in the second embodiment described above, the present invention is not limited to this example. A transmission cover of a sensor unit including one of a LiDAR and a camera or a sensor unit including a sensor other than the LiDAR and the camera may have a configuration similar to the transmission cover 223 according to the embodiment describe above.

Third Embodiment

Figure 14:
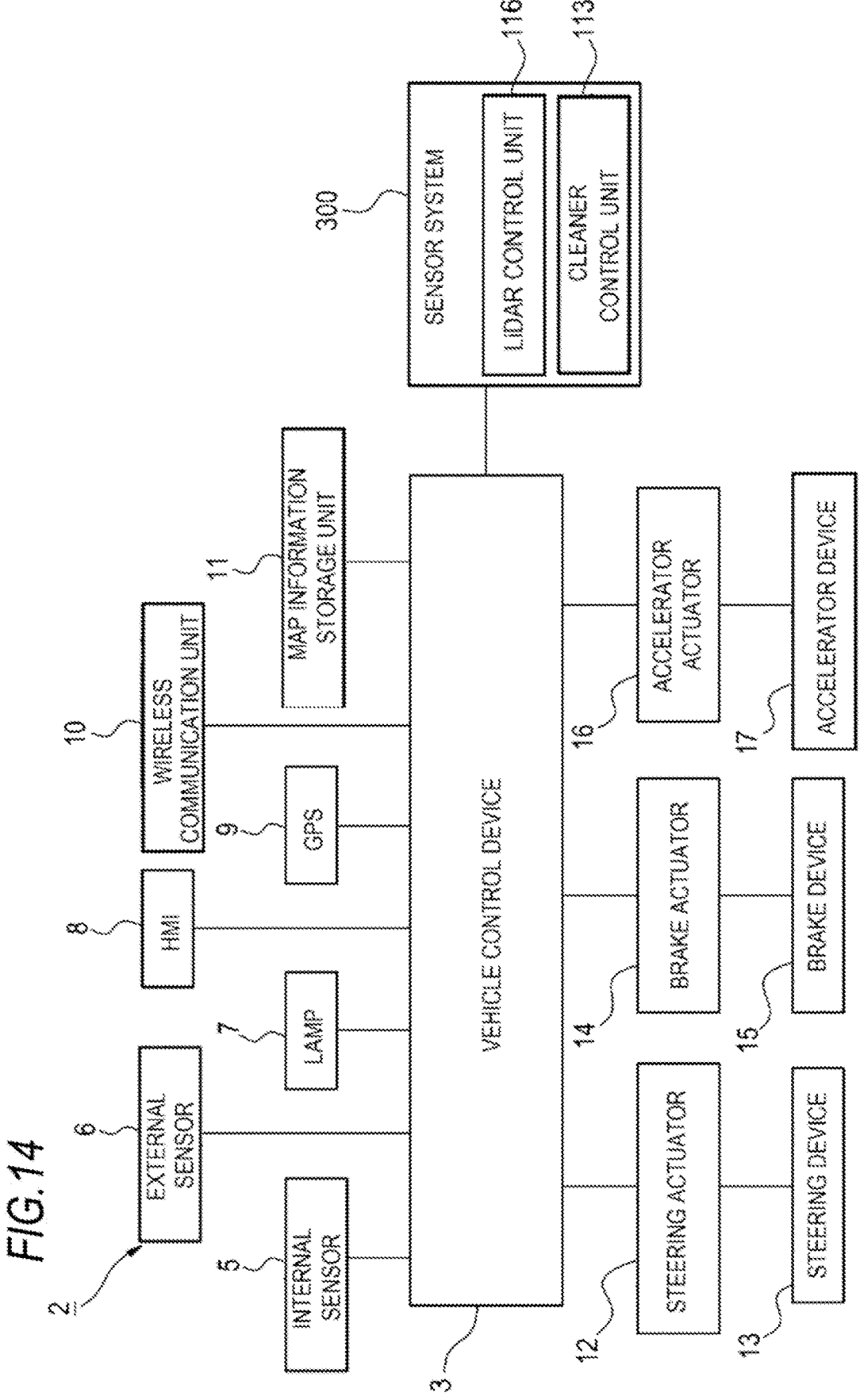
FIG. 14 is a block diagram showing a vehicle system in which a sensor system according to a third embodiment is incorporated.
Figure 15:
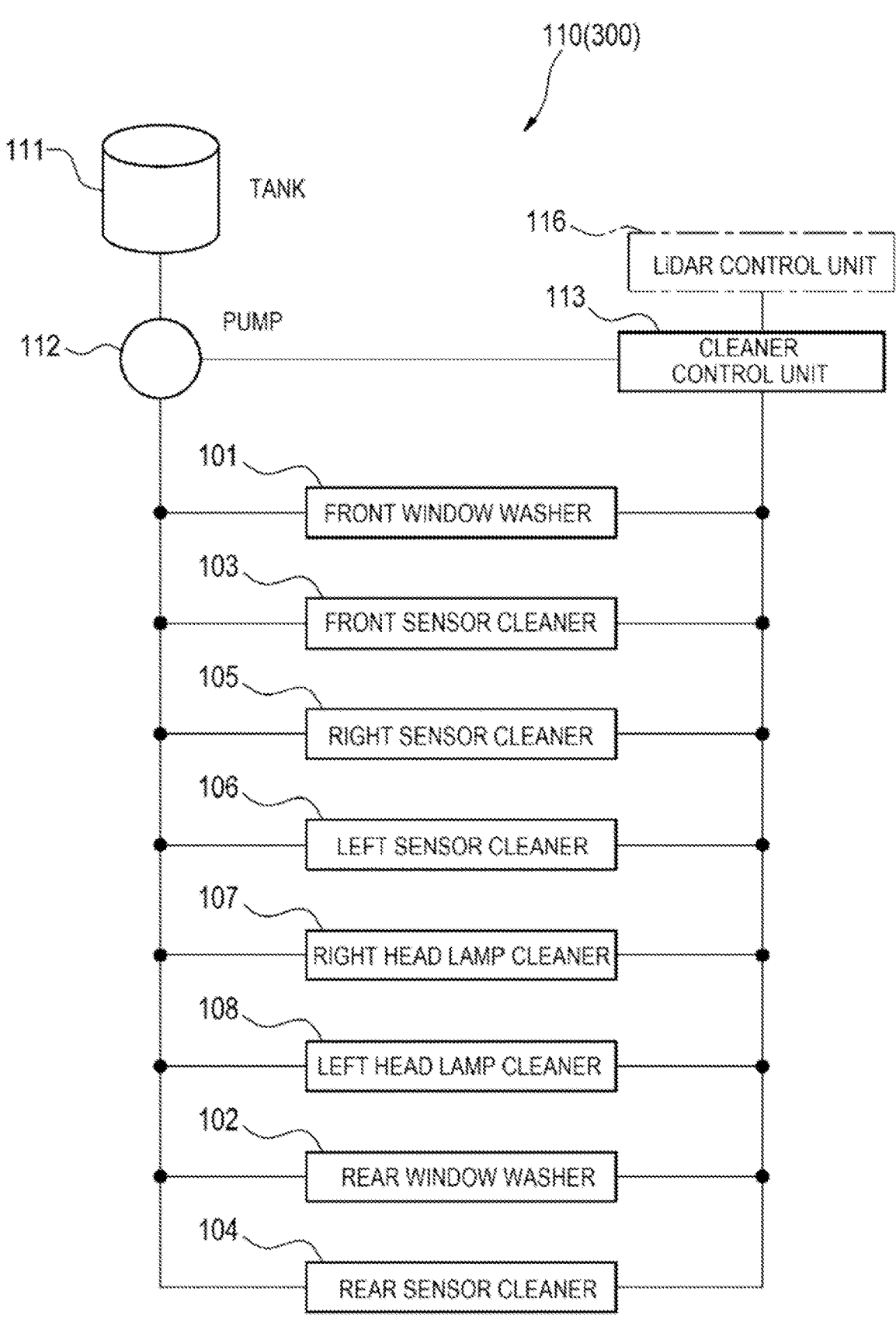
FIG. 15 is a block diagram showing a cleaner unit provided in the sensor system shown in FIG. 14.

Next, a sensor system according to a third embodiment will be described with reference to FIGS. 14 to 18. As shown in FIGS. 14 and 15, a sensor system 300 according to the third embodiment includes the LiDAR control unit 116 in addition to the cleaner control unit 113.

In the present embodiment, the cleaner control unit 113 is attached to a rear portion in the housing 121. The LiDAR control unit 116 is integrally attached to the housing 121. Similar to the modification of the first embodiment, the LiDAR control unit 116 is attached to a lower portion in the housing 121 (FIG. 8).

In the housing 121, positions at which the cleaner control unit 113 and the LiDAR control unit 116 are attached are not limited to the positions in the present embodiment.

Figure 16:
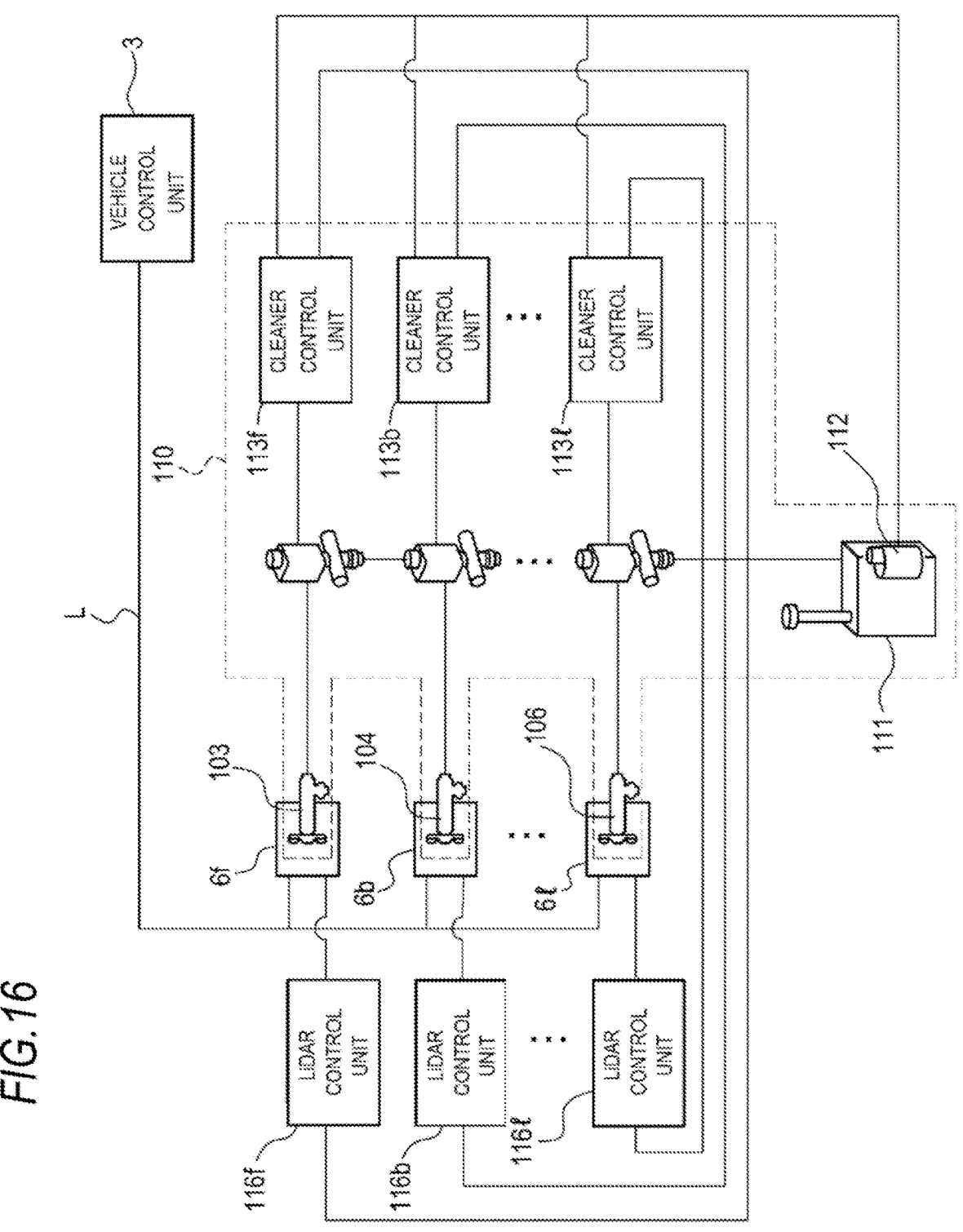
FIG. 16 is a block diagram showing functions of a LiDAR control unit and a cleaner control unit provided in the sensor system shown in FIG. 14.

Next, a functional configuration of the sensor system 300 according to the third embodiment will be described with reference to FIG. 16. FIG. 16 is a block diagram showing functions of the LiDAR control unit 116 and the cleaner control unit 113. In the present example, the LiDAR control unit 116 (116*f*, 116*b*, 116*r*, and 116*l*) and the cleaner control unit 113 (113*f*, 113*b*, 113*r*, and 113*l*) are provided for the LiDAR 6*f*, 6*b*, 6*r*, and 6*l*, as shown in FIG. 16. The right LiDAR 6*r*, and the LiDAR control unit 116*r* and the cleaner control unit 113*r* corresponding to the right LiDAR 6*r* are not shown in FIG. 16.

The LiDAR control units 116*f*, 116*b*, 11.6*r*, and 116*l* are electrically connected to the cleaner control units 113*f*, 113*b*, 113*r*, and 113*l* that respectively correspond to the LiDAR control units 116*f*, 116*b*, 116*r*, and 116*l*. Information acquired by the LiDAR control units 116*f*, 116*b*, 116*r*, and 116*l* and information acquired by the cleaner control units 113*f*, 113*b*, 113*r*, and 113*l* are exchanged between the LiDAR control units 116*f*, 116*b*, 116*r*, and 116*l* and the cleaner control units 113*f*, 113*b*, 113*r*, and 113*l*. The LiDAR control unit 116*f* is electrically connected to the front LiDAR 6*f* and controls the operation of the front LiDAR 6*f*. The cleaner control unit 113*f* is electrically connected to the front SC 103 (the liquid cleaner 103A and the air cleaner 103B) and the pump 112. The cleaner control unit 113 controls the operations of the front SC 103 and the pump 112.

The LiDAR control unit 116*f* receives, from the front LiDAR 6*f*, information acquired by the front LiDAR 6*f*. The LiDAR control unit 116*f* determines whether the transmission cover 123 that is an object to be cleaned is dirty based on the information received from the front LiDAR 6*f*. When it is determined that the transmission cover 123 is dirty, the LiDAR control unit 116*f* generates a dirt signal indicating that the transmission cover 123 is dirty, and transmits the generated dirt signal to the cleaner control unit 113*f*. For example, the LiDAR control unit 116*f* determines whether the transmission cover 123 is dirty based on the point cloud data of reflected light or stray light information of the reflected light acquired by the front LiDAR 6f. The point cloud data refers to three-dimensional mapping data of a reflection object acquired based on reflected light of light emitted from the LiDAR. The stray light information refers to scattering information of light on the reflection object acquired based on the reflected light of the light emitted from the LiDAR.

The cleaner control unit 113f controls the front SC 103 based on the dirt signal received from the LiDAR control unit 116f, and cleans the transmission cover 123 that is a cleaning target surface. For example, the cleaner control unit 113f controls the liquid cleaner 103A such that the first liquid nozzle 131a and the second liquid nozzle 131b of the liquid cleaner 1034 can clean the first area 123a and the second area 123b of the transmission cover 123 at the same time. Further, the cleaner control unit 113f controls the air cleaner 103B such that the first air nozzle 141a and the second air nozzle 141b of the air cleaner 103B can clean the first area 123a and the second area 123b at the same time.

Although not shown, the LiDAR control units 116f, 116b, 116r, and 116l may be electrically connected to the vehicle control unit 3. Information acquired by the LiDAR control units 116f, 116b, 116r, and 116l and information acquired by the vehicle control unit 3 are exchanged between the LiDAR control units 116f, 116b, 116r, and 116l and the vehicle control unit 3. The cleaner control units 113f, 113b, 113r, and 113l may be electrically connected to the vehicle control unit 3. Information acquired by the cleaner control units 113f, 113b, 113r, and 113l and information acquired by the vehicle control unit 3 are exchanged between the cleaner control units 113f, 113b, 113r, and 113l and the vehicle control unit 3. Although each of the LiDAR control units 116f, 116b, 116r, and 116l is provided between each of the LiDARs 6f, 6b, 6r, and 6l and each of the cleaner control units 113f, 113b, 113r, and 113l in the present embodiment, the present invention is not limited thereto. For example, the LiDAR control units 116f, 116b, 116r, and 116l may be provided on a communication line 1, that connects the LiDARs 6f, 6b, 6r and 6l and the vehicle control unit 3. Although the LiDAR control units 116f, 116b, 116r, and 116l and the cleaner control units 113f, 113b, 113r, and 113l are provided for the respective LiDARs 6f, 6b, 6r, and 6l in the example shown in FIG. 16, the present invention is not limited thereto. For example, one LiDAR control unit 116 and one cleaner control unit 113 may be provided for all of the LiDARs 6f, 6b, 6r, and 6l.

Next, an operation example of the sensor system 300 according to the third embodiment will be described with reference to FIGS. 17 and 18.

Figure 17:
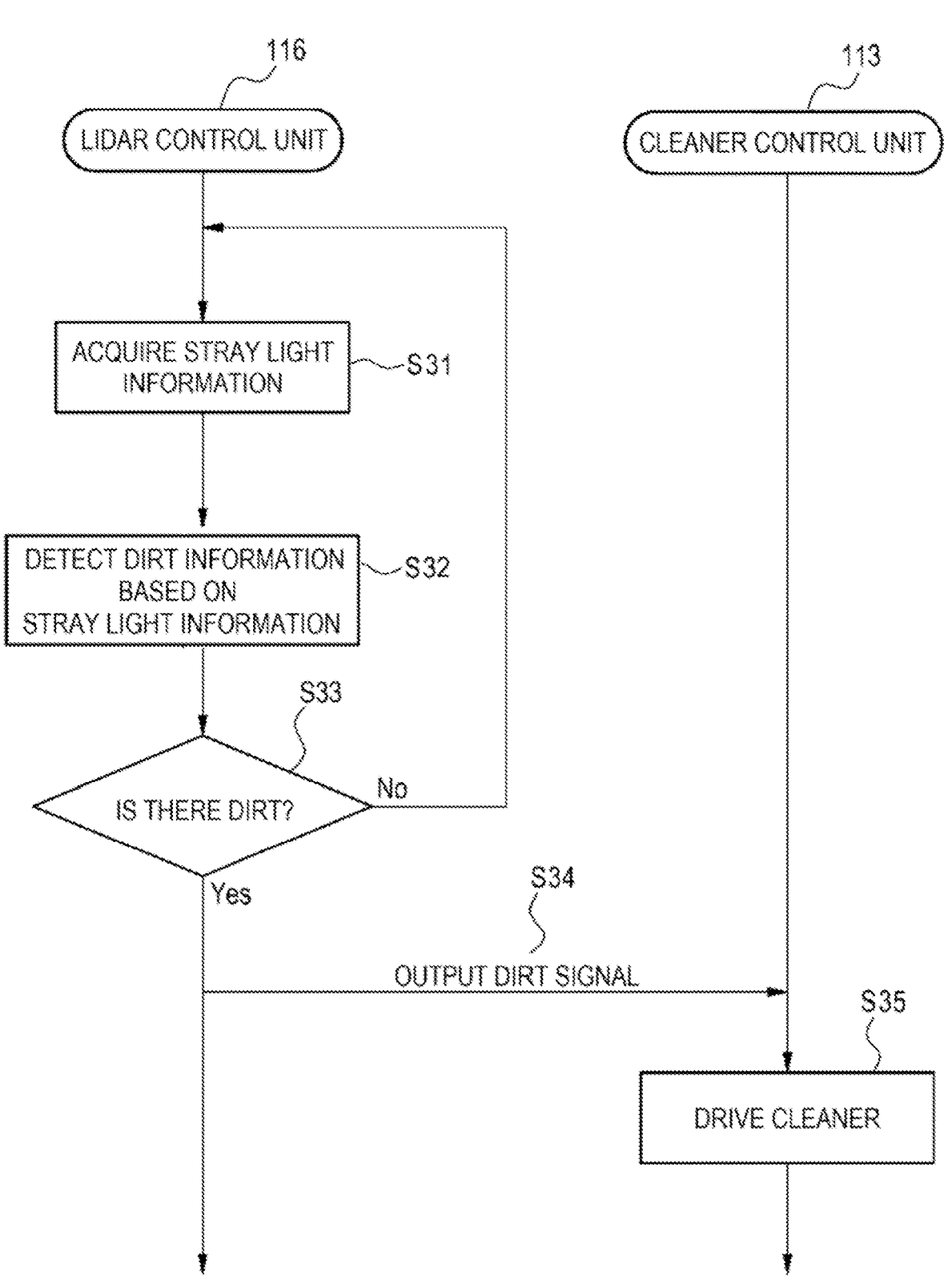
FIG. 17 is a flowchart showing an operation example of the sensor system shown in FIG. 14.

FIG. 17 is a flowchart showing an operation example of the sensor system 300. FIG. 18 is a schematic diagram showing stray light information of the transmission cover 123 acquired by the front LiDAR 6f.

First, in step S31, the LiDAR control unit 116 acquires stray light information of light on the reflection object based on light emitted from the front LiDAR 6f and reflected light received by the front LiDAR 6f, as shown in FIG. 17. That is, the LiDAR control unit 116 acquires stray light information indicating a surrounding environment of the vehicle 1 at a predetermined frame rate.

Next, in step S32, the LiDAR control unit 116 detects dirt information of the transmission cover 123 based on the acquired stray light information. For example, the LiDAR control unit 116 detects a scattering state of the reflected light that was received by the front LiDAR 6f.

Figure 18:
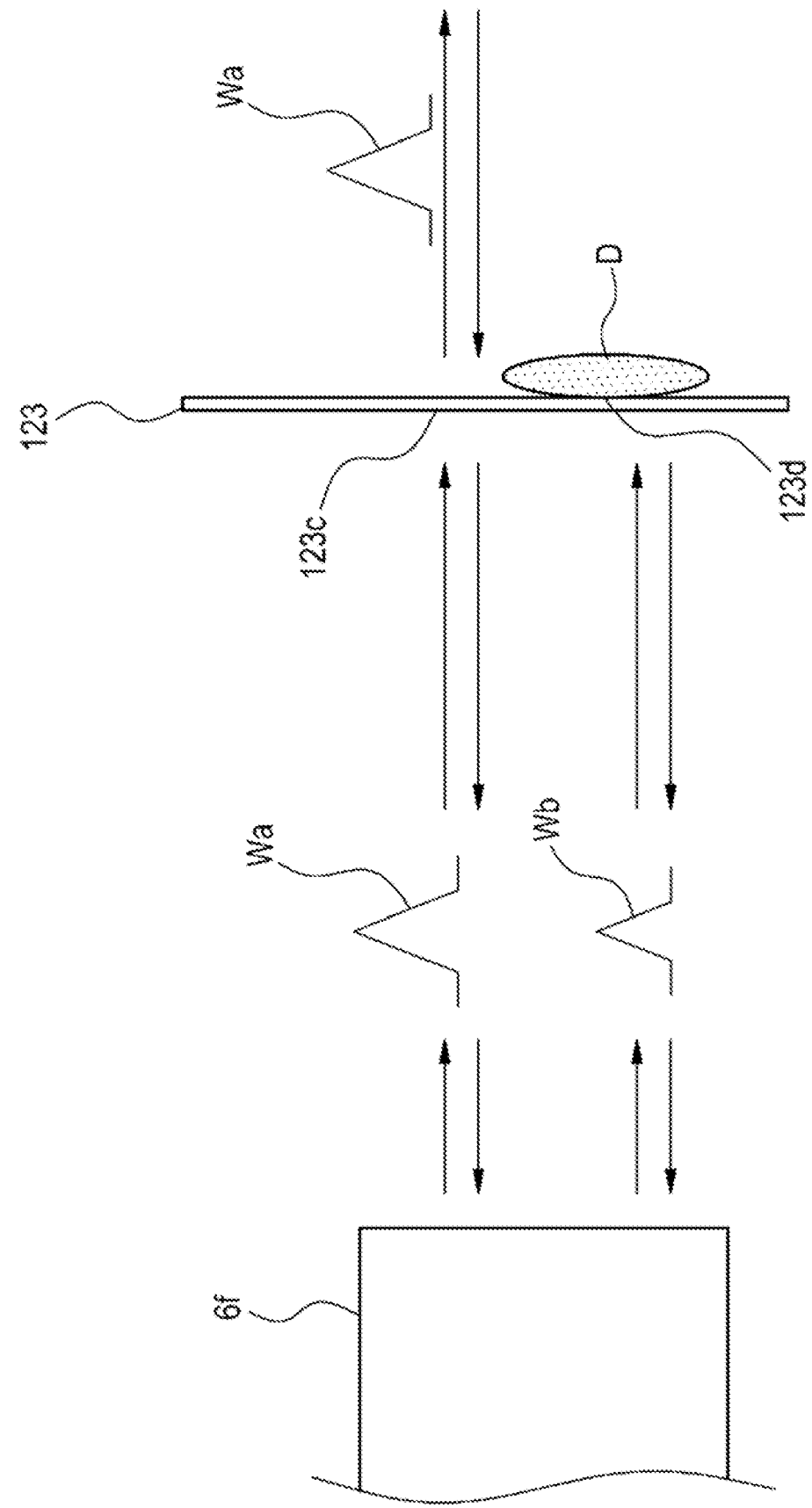
FIG. 18 is a schematic diagram showing stray light information of a transmission cover.

For example, in an area 123c where no dirt is adhered to the transmission cover 123, light emitted from the from LiDAR 6f passes through the transmission cover 123, is reflected by an object outside the vehicle, and is received by the front LiDAR 6f as a regular waveform Wa of reflected light, as shown in FIG. 18. On the other hand, in an area 123d where dirt such as dust D adheres to the transmission cover 123, light emitted from the front LiDAR 6f is reflected by the dust D adhered to the transmission cover 123, and is received by the front LiDAR 6f as an irregular waveform Wb of reflected light (reflected stray light) that is unnecessarily scattered.

Next, in step S33, the LiDAR control unit 116 determines whether dirt adheres to the transmission cover 123 based on the dirt information detected in step S2. For example, when the LiDAR control unit 116 detects the reflected stray light, the LiDAR control unit 116 determines whether an intensity of the reflected stray light (reflected stray light intensity) is equal to or larger than a predetermined threshold. The reflection stray light intensity may be defined based on, for example, a ratio of the reflected stray light to total received reflected light, or may be defined based on a size of an area of the reflected stray light on the transmission cover 123.

When it is determined in step S33 that the reflected stray light intensity is not equal to or larger than the predetermined threshold (No in step S33), the LiDAR control unit 116 returns the processing to step S31.

On the other hand, when it is determined in step S33 that the reflected stray light intensity is equal to or larger than the predetermined threshold (Yes in step S33), the LiDAR control unit 116 generates a dirt signal and transmits the generated dirt signal to the cleaner control unit 113 in step S34.

When the dirt signal is transmitted from the LiDAR control unit 116 to the cleaner control unit 113, the cleaner control unit 113 uses the received dirt signal as a trigger to drive, for example, the liquid cleaner 103A and the pump 112 in step S35. As a result, the cleaning liquid is ejected from the first liquid nozzle 131a and the second liquid nozzle 131b of the liquid cleaner 103A to the first area 123a and the second area 123b of the transmission cover 123. Thereafter, the processing is ended.

Operation Example According to Modification

Although the LiDAR control unit 116 determines whether dirt adheres to the transmission cover 123 based on the stray light information of the transmission cover 123 in the operation example of the sensor system 300 described above, the present invention is not limited thereto. For example, the LiDAR control unit 116 may determine whether dirt adheres to the transmission cover 123 based on the point cloud data acquired by the front LiDAR 6f.

For example, the LiDAR control unit 116 acquires three-dimensional mapping data (point cloud data) of light on the reflection object based on the light emitted from the front LiDAR 6f and the reflected light received by the front LiDAR 6f. Next, the LiDAR control unit 116 detects dirt information of the transmission cover 123 based on missing of the acquired point cloud data. The missing of the point cloud data is detected based on, for example, an intensity of light received by the LiDAR 6f. Specifically, among the point cloud data, data having a received light intensity equal to or less than a predetermined threshold and/or equal to or more than a predetermined threshold is determined as "missing (or noise)". Then, when the LiDAR control unit 116 determines that the missing degree of the point cloud data is equal to or larger than the predetermined threshold, the LiDAR control unit 116 may determine that dirt adheres to the transmission cover 123 and transmit a dirt signal to the cleaner control unit 113.

As described above, the sensor system 300 according to the third embodiment includes the front LiDAR 6f, the from sensor cleaner 103 having the nozzle 131 capable of cleaning the transmission cover 123 that covers the front LiDAR 6f using a cleaning medium, the LiDAR control unit 116 (an example of a sensor control unity that controls the front LiDAR 6f, and the cleaner control unit 113 that controls the front sensor cleaner 103. The LiDAR control unit 116 transmits the dirt signal generated based on the information detected by the front LiDAR 6f to the cleaner control unit 113 without passing through the vehicle control unit 3 that controls the entire vehicle 1. As described above, according to the present embodiment, the LiDAR control unit 116 provided separately from the vehicle control unit 3 determines whether dirt adheres to the transmission cover 123 that is a cleaning target surface corresponding to the front LiDAR 6f, and directly transmits the determination result to the cleaner control unit 113 without passing through the vehicle control unit 3. Accordingly, a cleaning operation on a sensor can be controlled without increasing a processing load of the vehicle control unit 3.

In the present embodiment, the cleaner control unit 113 and the LiDAR control unit 116 are integrally attached to the housing 121. As a result, since a control function of a cleaner is also integrated with the sensor system 300, it is possible to efficiently transmit the dirt signal from the LiDAR control unit 116 to the cleaner control unit 113. Since control functions of the front sensor cleaner 103 and the front LiDAR 6f are also integrated with the sensor system 300, it is possible to reduce the processing load of the vehicle control unit 3 that is a vehicle ECU.

In the present embodiment, the cleaner control unit 113 generates a dirt signal indicating whether dirt adheres to the transmission cover 123 based on the point cloud data acquired by the front LiDAR 6f or the stray light information of the transmission cover 123 acquired by the front LiDAR 6f. Therefore, according to the present embodiment, it is possible to easily generate the dirt signal using the point cloud data or the stray light information acquired by the front LiDAR 6f.

Although a case where the front LiDAR 6f and the front camera 6g are accommodated in the front sensor unit 320f has been described in the third embodiment described above, the present invention is not limited thereto. For example, only the LiDAR may be accommodated in each sensor unit. That is, the LiDAR and the camera may not be integrated.

Although the dirt signal is generated based on the dirt information detected from the point cloud data or the stray light information acquired by the front LiDAR 6f between the front LiDAR 6f and the front camera 6g that are accommodated in the front sensor unit 320f in the third embodiment described above, the present invention is not limited thereto. For example, the dirt signal may be generated based on dirt information detected from image data acquired by the front camera 6g.

Although it is determined whether dirt adheres to the transmission cover 123, that is, whether the transmission cover 123 needs to be cleaned, based on the missing degree of the point cloud data in the third embodiment described above, the present invention is not limited to this example. For example, when a distance from the front LiDAR 6f to a specific area included in the point cloud data is substantially equal to a distance from the front LiDAR 6f to the transmission cover 123 based on distance information calculated from the point cloud data, it may be determined that dirt adheres to the transmission cover 123.

Fourth Embodiment

Figure 19:
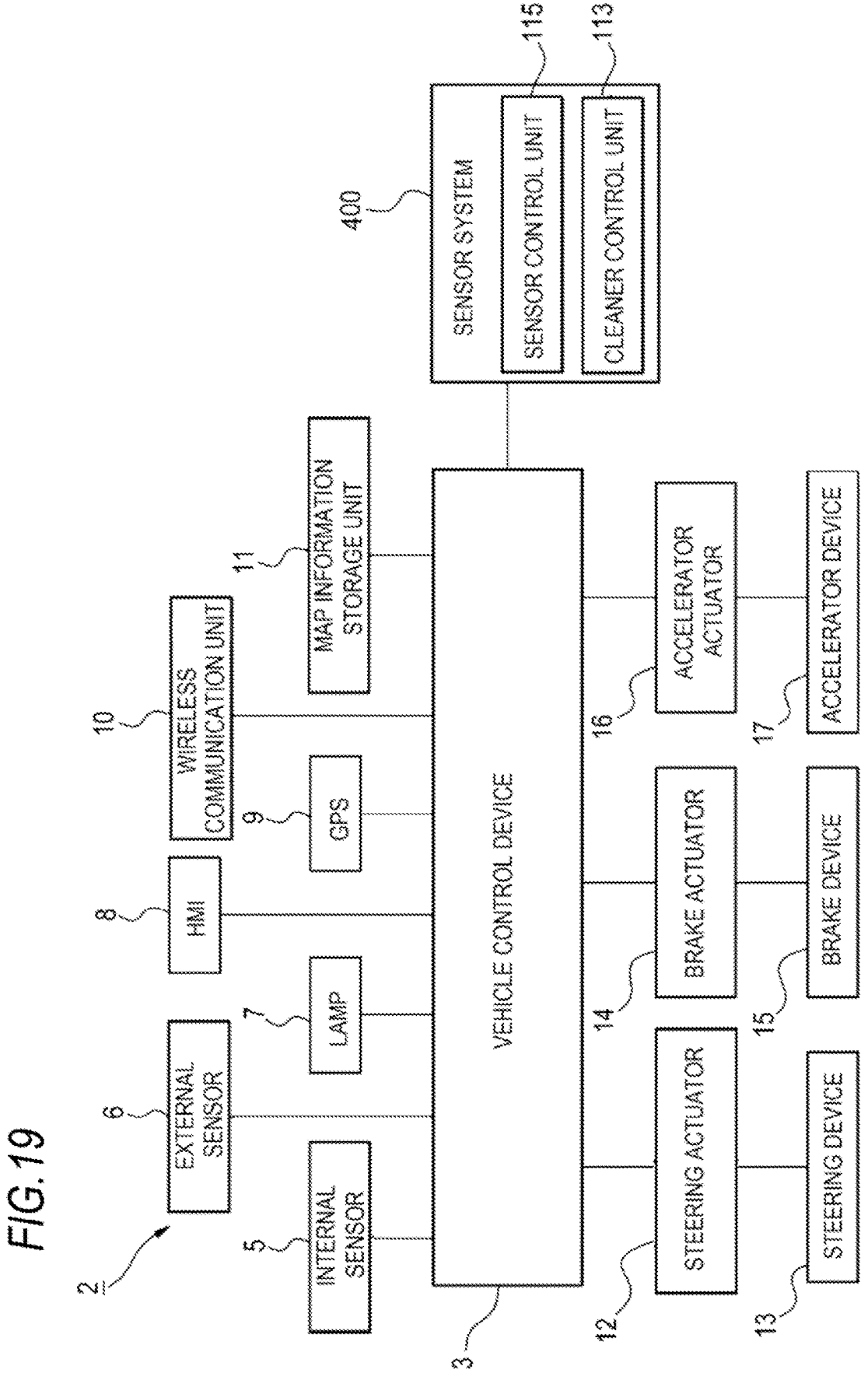
FIG. 19 is a block diagram showing a vehicle system in which a sensor system according to a fourth embodiment is incorporated.

FIG. 19 is a block diagram showing the vehicle system 2 in which a sensor system 400 according to a fourth embodiment is incorporated.

As shown in FIG. 19, the sensor system 400 that includes the cleaner control unit 113 and a sensor control unit 115 is communicably connected to the vehicle control unit 3 of the vehicle system 2.

Figure 20:
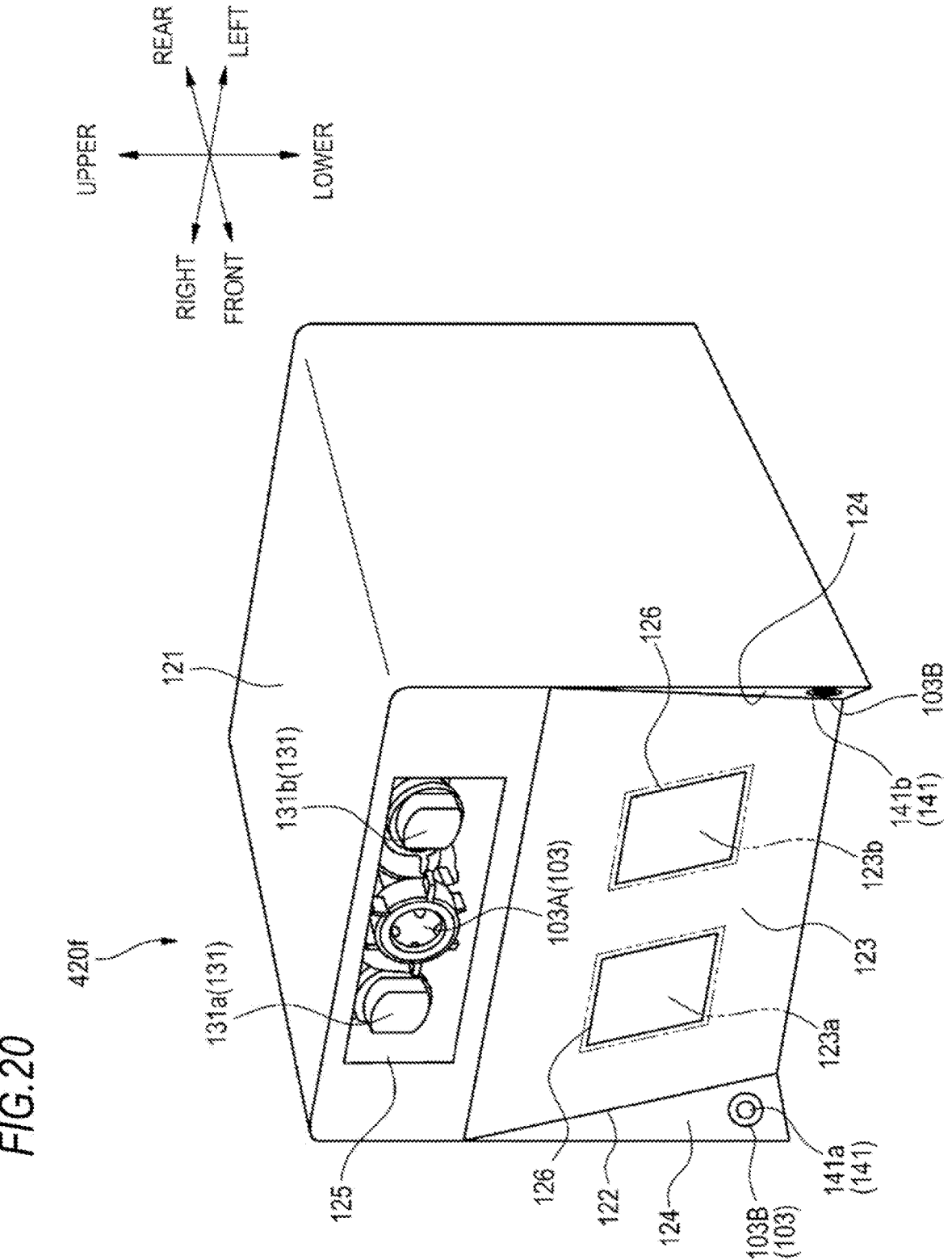
FIG. 20 is a perspective view showing a sensor unit provided in the sensor system shown in FIG. 19.
Figure 21:
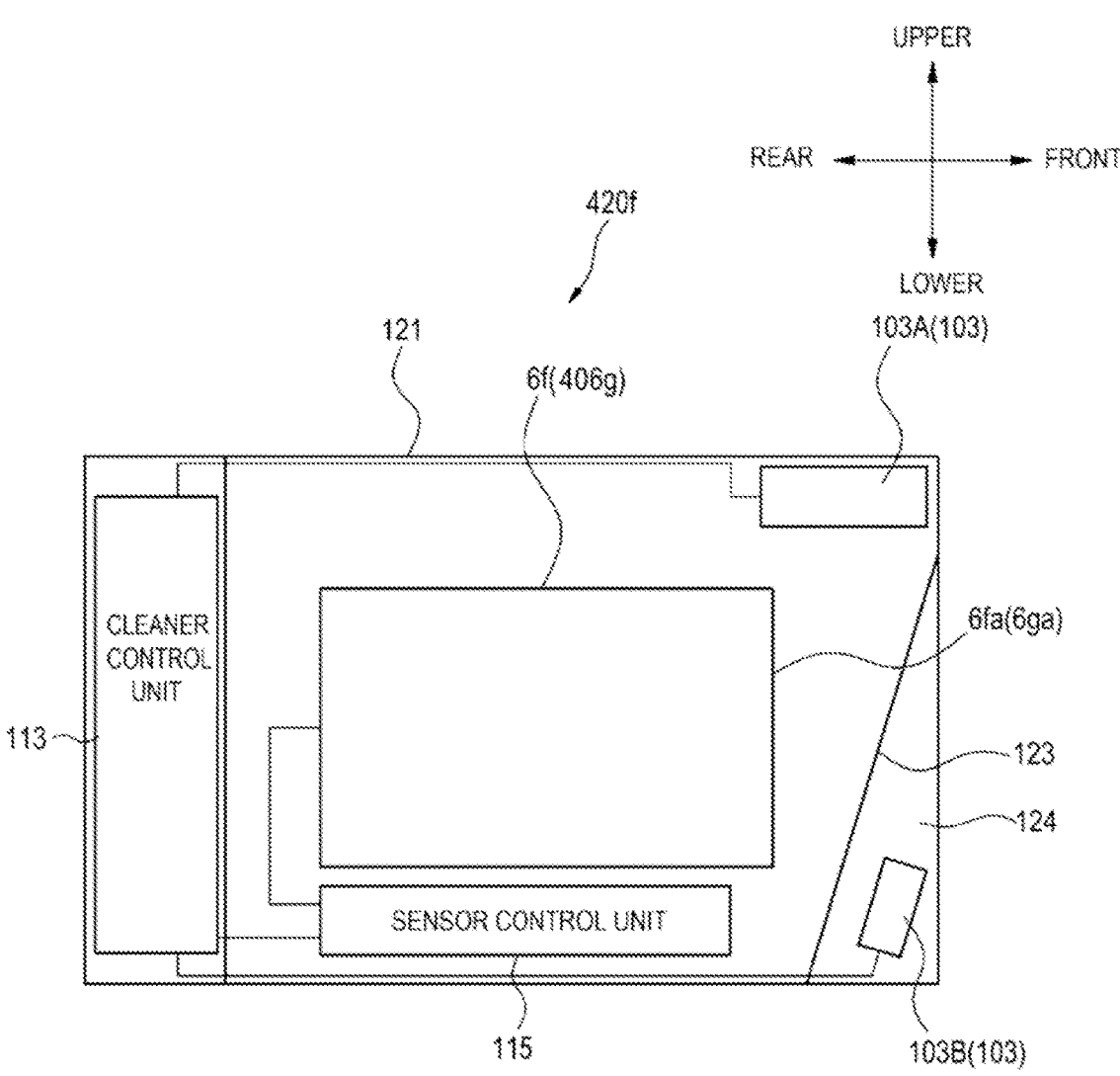
FIG. 21 is a schematic diagram showing an internal configuration of the sensor unit shown in FIG. 20.

FIG. 20 is a perspective view showing a configuration of a sensor unit in which a cleaner and a sensor such as a LiDAR or an infrared camera are integrated. FIG. 21 is a schematic diagram showing an internal configuration of the sensor unit shown in FIG. 21. Among a plurality of sensor units provided in the sensor system 400, a front sensor unit 420f provided at the front portion of the vehicle 1 will be described in the example to be described below.

As shown in FIGS. 20 and 21, the front sensor unit 420f provided in the sensor system 400 according to the fourth embodiment includes the housing 121, the front LiDAR 6f, a front infrared camera 406g, the liquid cleaner 103A, the air cleaner 103b, the cleaner control unit 113, and the sensor control unit 115. The liquid cleaner 103A and the air cleaner 103B are cleaners constituting the front SC 103.

The housing 121 is made of, for example, synthetic resin, and is formed into a substantially box shape. Although not shown in FIG. 20, the front LiDAR 6f and the front infrared camera 406g are accommodated in the housing 121. For example, the front LiDAR 6f and the front infrared camera 406a are accommodated in the housing 121 side by side in the left-right direction in a manner in which the light emission surface 6fa and the lens 6ga shown in FIG. 21 face a front side.

A transmission cover 123 is attached to the opening 122 of the housing 121 in a manner of covering the opening 122 without a gap. The transmission cover 123 is formed of, for example, a transparent or translucent synthetic resin. The transmission cover 123 is attached in a manner of covering the opening 122 so as to cover the front surface areas of the front LiDAR 6f and the front infrared camera 406g that are accommodated in the housing 121. The transmission cover 123 is attached in a manner of covering the front surface areas of the front LiDAR 6f and the front infrared camera 406g, and thus is configured as a cleaning target surface corresponding to the front LiDAR 6f and the front infrared camera 406g in the front sensor unit 420f.

The transmission cover 123 is attached in a manner of extending in a direction inclined relative to a plane orthogonal to an optical axis of the front LiDAR 6f accommodated in the housing 121. The transmission cover 123 is attached in a manner of being inclined so as to come close toward an inner side of the housing 121 from the upper direction toward the lower direction. For example, the transmission cover 123 is inclined toward a back side (rear side) of the housing 121 from the upper direction toward the lower direction. The transmission cover 123 is formed in a manner in which a width in the left-right direction becomes narrower from the upper direction to the lower direction tin a manner of being separated from a side wall of the housing 121).

An inclined direction of the transmission cover 123 is not limited to the inclined direction described above. As long as the transmission cover 123 is inclined relative to a plane orthogonal to the optical axis of the front LiDAR 6f, for example, the transmission cover 123 may be inclined in a manner of coming close toward the inner side of the housing 121 from the right (left) direction toward the left (right) direction.

The housing 121 has protruding portions 124 that protrude outward (forward) from a surface of the transmission cover 123 in the left-right direction of the transmission cover 123 by attaching the transmission cover 123 in an inclined manner as described above. In the present embodiment, since the transmission cover 123 comes close toward the inner side of the housing 121 from the upper direction toward the lower direction, triangular pyramid-shaped protruding portion 124 is formed in each of the right direction and the left direction of the transmission cover 123.

In a modification in which the transmission cover 123 comes close toward the inner side of the housing 121 from the right (left) direction toward the left (right) direction, the protruding portion 124 is formed, for example, only in the left (right) direction (or the protruding portions 124 is formed in each of the upper direction and the lower direction) of the transmission cover 123.

The liquid cleaner 103A is a cleaner capable of cleaning a cleaning target surface corresponding to the front LiDAR 6f and the front infrared camera 406g, that is, the transmission cover 123 that covers front surface areas of the front LiDAR 6f and the front infrared camera 406g using a cleaning liquid. Similarly, the air cleaner 103B is a cleaner capable of cleaning the transmission cover 123 that covers the front surface areas of the front LiDAR 6f and the front infrared camera 406g using air.

The cleaner control unit 113 that controls the liquid cleaner 103A and the air cleaner 103B is integrally attached to the housing 121. In the present embodiment, the cleaner control unit 113 is attached to a rear portion in the housing 121. The sensor control unit 115 is also integrally attached to the housing 121. In the present embodiment, the sensor control unit 115 is attached to a lower portion in the housing 121.

In the housing 121, positions at which the cleaner control unit 113 and the sensor control unit 115 are attached are not limited to the positions in the present embodiment.

The front LiDAR 6f and the front infrared camera 406g are electrically connected to the sensor control unit 115. The sensor control unit 115 controls the operations of the front LiDAR 6f and the front infrared camera 406g. The sensor control unit 115 receives, from the front LiDAR 6f, distance information, direction information, and the like that is related to an object present around the vehicle and is acquired by the front LiDAR 6f. In addition, the sensor control unit 115 receives, from the front infrared camera 406g, image information, distance information, and the like that is related to an object present around the vehicle and is acquired by the front infrared camera 406g. For example, the sensor control unit 115 generates a new captured image by executing a complementing processing on an image captured by the front infrared camera 406g. For example, the sensor control unit 115 uses distance information that is related to the object present around the vehicle and is acquired by the front LiDAR 6f to complement a captured image that is an image of the object present around the vehicle and is acquired by the front infrared camera 406g. For example, the sensor control unit 115 preferentially uses one of the distance information that is related to the object present around the vehicle and is acquired by the front LiDAR 6f and the distance information that is related to the object present around the vehicle and is acquired by the front infrared camera 406g according to a weather condition around the vehicle.

The cleaner control unit 113 and the sensor control unit 115 are electrically connected to each other. Information acquired by the cleaner control unit 113 and information acquired by the sensor control unit 115 are exchanged between the cleaner control unit 113 and the sensor control unit 115. Although not shown, the sensor control unit 115 is electrically connected to the vehicle control unit 3. Information acquired by the sensor control unit 115 and information acquired by the vehicle control unit 3 are exchanged between the sensor control unit 115 and the vehicle control unit 3. Although the sensor control unit 115 and the vehicle control unit 3 are provided as separate bodies in the present embodiment, the sensor control unit 115 and the vehicle control unit 3 may be provided as an integrated body. In this regard, the sensor control unit 115 and the vehicle control unit 3 may be configured with a single electronic control unit. Although the cleaner control unit 113 and the sensor control unit 115 are provided for each of the sensor units 120f, 120b, 120r, and 120l in the present embodiment, the present invention is not limited thereto. For example, one cleaner control unit 113 and one sensor control unit 115 may be provided for all of the sensor units 120f, 120b, 120r, and 120l.

Next, an infrared camera mounted on each sensor unit will be described.

Figure 22:
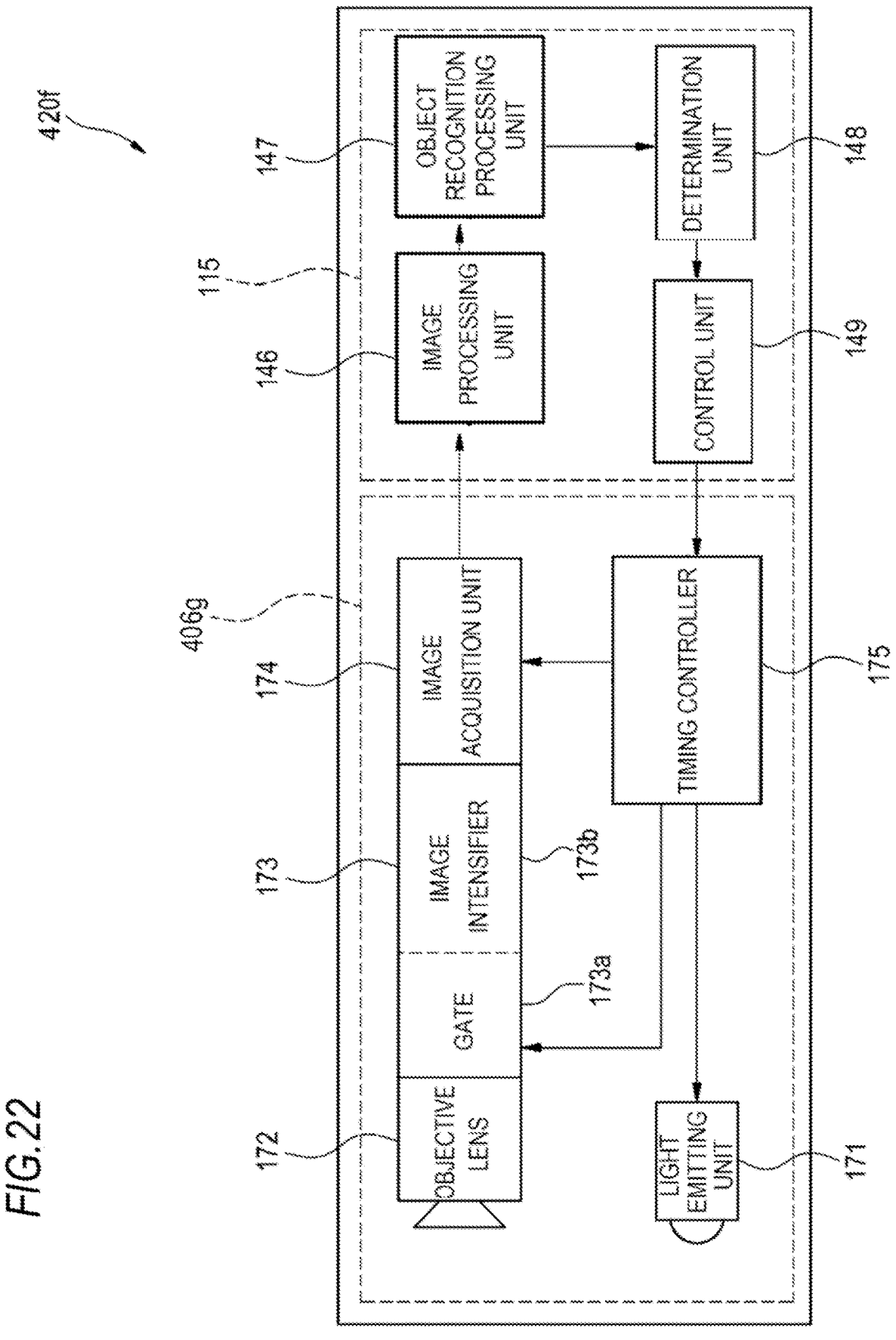
FIG. 22 is a block diagram showing a configuration of an infrared camera provided in the sensor unit shown in FIG. 21.
Figure 23:
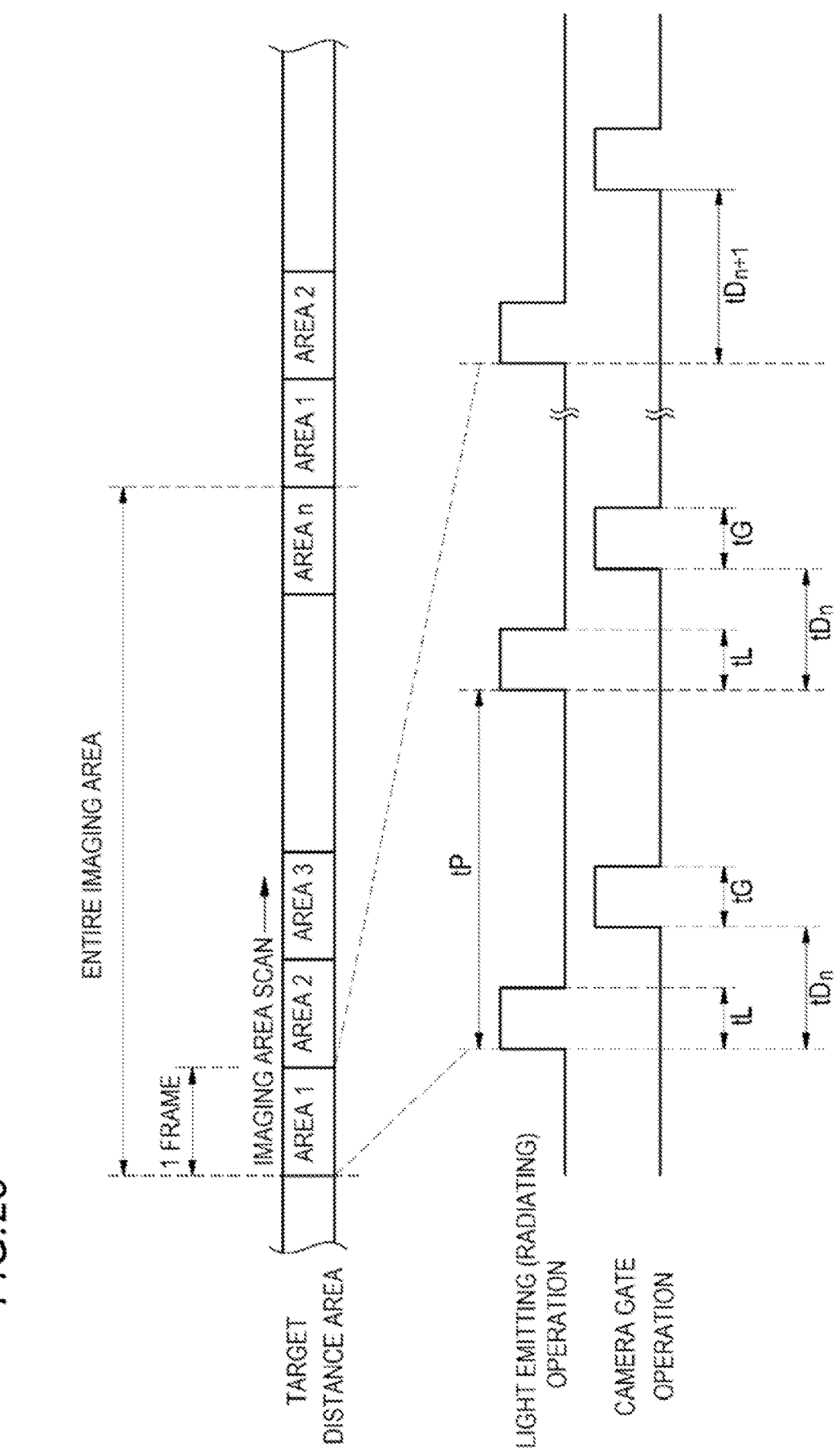
FIG. 23 is a diagram showing a temporal relationship between an operation of a light emitting unit and an operation of a camera gate when each target distance area is imaged.

FIG. 22 is a block diagram showing a configuration of the front infrared camera 406g and the sensor control unit 115. FIG. 23 is a diagram showing a temporal relationship between an operation of a light emitting unit (a light emitting operation) and an operation of a gate (a camera gate operation) when each target distance area is imaged by the front infrared camera 406g. The front infrared camera 406g is a camera capable of capturing an image of the surroundings of the vehicle using a time of flight method (hereinafter, referred to as a ToF method). The ToF imaging method refers to a method in which pulsed light is emitted in a predetermined period, and reflected light from a target distance is imaged at an imaging timing set according to the target distance, thereby obtaining a plurality of captured images in different target distances, and distance image data indicating a distance to an object for each pixel is generated based on luminance of the same pixel in the plurality of captured images. Hereinafter, imaging of a distance image by the infrared camera 406g using the ToF method will be described in detail.

As shown in FIG. 22, the front infrared camera 406g includes a light emitting unit 171, an objective lens 172, a light multiplier 173, an image acquisition unit 174, and a timing controller (a timing control unit) 175. The sensor control unit 115 connected to the front infrared camera 406g includes an image processing unit 146, an object recognition processing unit 147, a determination unit 148, and a control unit 149.

The light emitting unit 171 is, for example, an infrared LD or an infrared LED disposed at a front end portion of the vehicle 1. As shown in FIG. 23, the light emitting unit 171 emits pulsed light in a predetermined direction (for example, to a front side of the vehicle 1) for a predetermined light emission time tL (for example, 5 ns) in response to a light emission pulse signal output from the timing controller 175. A light emission period tP of the pulsed light emitted from the light emitting unit 171 is, for example, an interval of 10 μs or less.

The objective lens 172 is, for example, an optical system set to have an angle of view at which a predetermined range in front of the vehicle 1 can be imaged, and receives light reflected from an object. The objective lens 172 may be disposed in a manner of being close to the light emitting unit 171 or may be disposed in a manner of being apart from the light emitting unit 171.

The light multiplier 173 includes a gate 173a and an image intensifier 173b. The gate 173a is opened and closed in response to an opening and closing command signal from the timing controller 175. In the present embodiment, an open time (a gate time) tG of the gate 173a is, for example, 5 ns, which is the same as the light emission time tL. The gate time tG is proportional to a length of an object to be imaged (a depth of an object to be imaged) in each area (a target distance area) in the entire imaging area from an area 1 to an area n. The longer the gate time tG is, the longer the length of the object to be imaged in each area is. The length of the object to be imaged is obtained from a light speed×the gate time tG. In the present embodiment, since the gate time tG is 5 ns, the length of the object to be imaged is 1.5 in according to "the light speed (about $3 \times 10^8$ m/s)×the gate time (5 ns)". The image intensifier 173b is a device that temporarily converts extremely weak light (light reflected from an object or the like) into electrons, electrically amplifies the electrons, and returns the electrons to a fluorescent image again, thereby doubling a light amount to view an image with contrast. The light amplified by the image intensifier 173b is guided to an image sensor of the image acquisition unit 174.

The image acquisition unit 174 acquires an image generated from the light multiplier 173 in response to a command signal from the timing controller 175, and outputs the acquired image to the image processing unit 146 of the sensor control unit 115. In the present embodiment, for example, an image acquisition unit having a resolution of 640×480 (horizontal:vertical), a luminance value of 1 to 255 (256 levels), and 100 fps or more is used.

The timing controller 175 controls the imaging timing such that the captured image acquired by the image acquisition unit 174 becomes a captured image at a timing when the image is acquired based on reflected light returning from a target distance area that is a target imaging area. For example, the timing controller 175 sets a delay time tD (tDn, tDn+1 in FIG. 23) that is a time from a light emission start time point of the light emitting unit 171 up to a time point when the gate 173a is opened, and outputs an opening and closing command signal corresponding to the delay time tD, thereby controlling the imaging timing. The delay time tD is a value that determines a distance (an imaging target distance) from the vehicle 1 to the target distance area. A relationship between the delay time tD and the imaging target distance is obtained from the following equation (1).

$$\text{imaging target distance} = \text{light speed (about } 3 \times 10^8 \text{ m/s}) \times \text{delay time tD/2} \quad (1)$$

The timing controller 175 increases the delay time tD by a predetermined interval (for example, 10 ns) so as to continuously separate the target distance area from a front side (a far side) of the vehicle 1, thereby changing an imaging range of the image acquisition unit 174 to a front side of the vehicle 1. The timing controller 175 starts an imaging operation of the image acquisition unit 174 immediately before the gate 173a is opened, and ends the imaging operation after the gate 173a is completely closed.

The timing controller 175 controls the light emitting unit 171, the gate 173a, and the image acquisition unit 174 so as to execute light emission and light exposure for a plurality of times for each predetermined target distance area (each of the area 1, the area 2, . . . , and the area n) that was set. The light received by the image acquisition unit 174 is converted into electric charges, and is accumulated by repeating light emission and light exposure for a plurality of times. One captured image obtained for each predetermined electric charge accumulation time is referred to as a frame. The image acquisition unit 174 may acquire one captured image (one frame) in each target distance area, or may acquire a plurality of captured images (several frames) in each target distance area.

In this manner, the image acquisition unit 174 can acquire a plurality of captured images in different target distance areas using the ToF method. The image acquisition unit 174 outputs the acquired plurality of captured images to the image processing unit 146 of the sensor control unit 115.

The image processing unit 146 generates distance image data indicating a distance to an object for each pixel based on captured images in the entire imaging area acquired by the image acquisition unit 174, and outputs the generated distance image data to the object recognition processing unit 147.

The object recognition processing unit 147 specifies an object included in the distance image data. A known technique such as pattern matching can be used as a method of specifying an object.

The determination unit 148 determines a relationship (a distance, a direction, or the like) between the object (a person, an automobile, a sign, or the like) specified by the object recognition processing unit 147 and an own vehicle (the vehicle 1).

The control unit 149 controls the operations of the front LiDAR 6f and the front infrared camera 406g based on the distance information, the direction information, or the like that is related to the object and is determined by the determination unit 148. The control unit 149 generates processed image data by complementing the distance image data acquired by the front infrared camera 406g using the ToF method. The control unit 149 outputs an instruction signal for instructing control contents to the timing controller 175 that controls each unit of the front infrared camera 406g.

Next, an operation of acquiring a distance image according to the present embodiment will be described.

The timing controller 175 sets the delay time tD such that the captured image acquired by the image acquisition unit 174 becomes a captured image based on reflected light returning from a predetermined target distance area, and controls the imaging timing of the image acquisition unit 174. When an object is present in the target distance area, a time during which the light emitted from the light emitting unit 171 returns from the target distance area is a time during which the light reciprocates within the distance (the imaging target distance) between the vehicle 1 and the target distance area. Therefore, the delay time tD can be obtained from the imaging target distance and a light speed.

In the captured image acquired by the image acquisition unit 174 using the above method, when an object is present in the target distance area, luminance value data of a pixel corresponding to a position of the object is affected by reflected light, and therefore is higher than luminance value data of other pixels. As a result, a distance to an object present in the target distance area can be obtained based on the luminance value data of each pixel.

Figure 24:
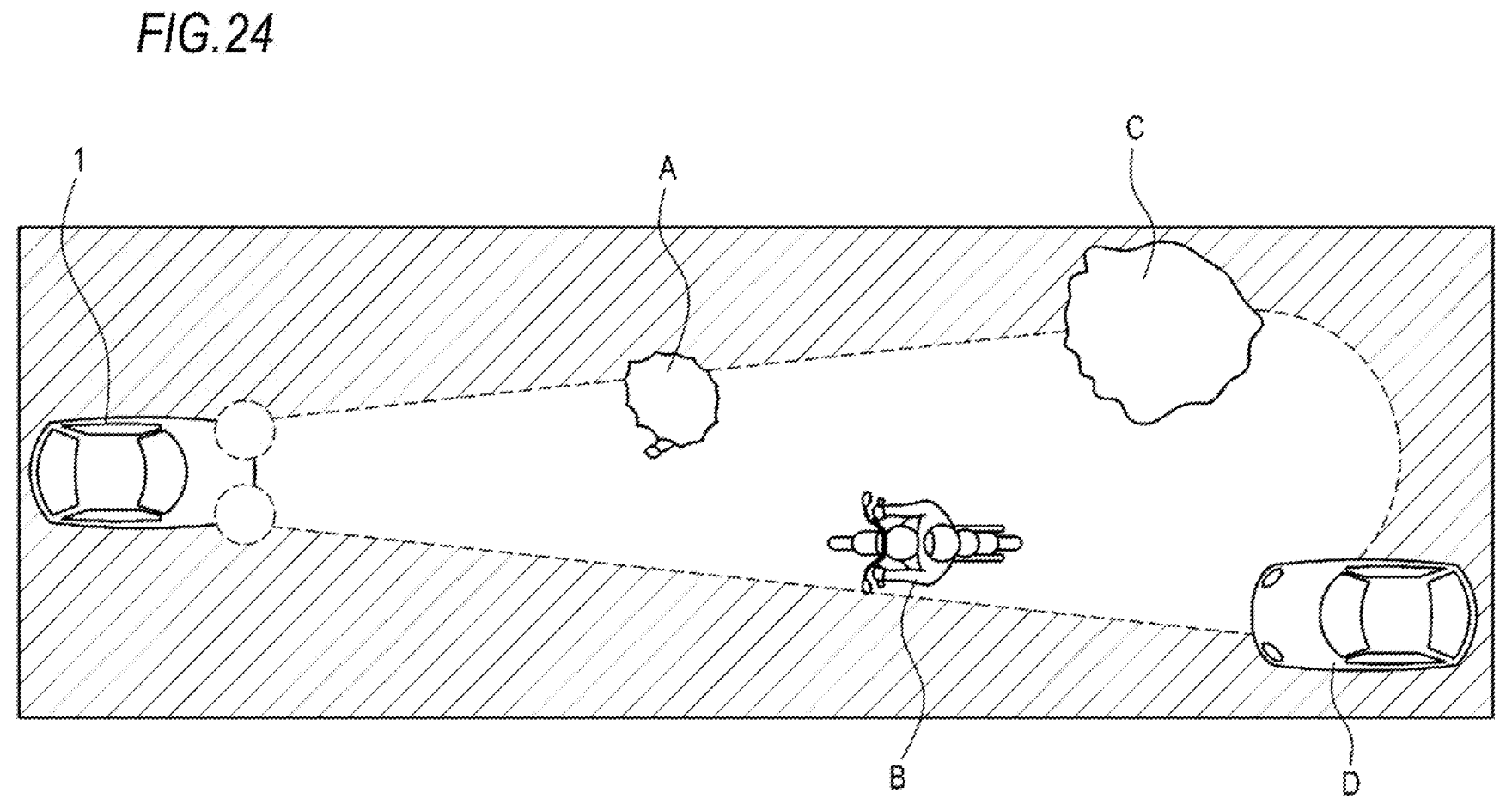

FIG. 24 shows a situation in which four of A to D are present at different positions in front of the vehicle 1. The object A is a person with an umbrella, the object B is a motorcycle at an opposite lane side, the object C is a tree at a sidewalk side, and the object D is a vehicle at an opposite lane side (oncoming vehicle). A relationship of distances between the vehicle 1 to the objects is A<B<C<D.

Figure 25:
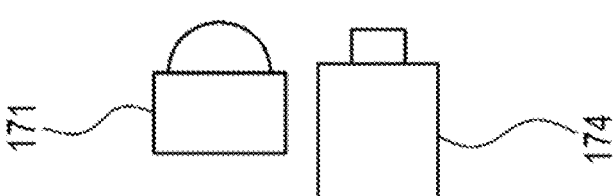
FIG. 25 is a diagram showing a state in which a plurality of continuous imaging areas partially overlap with one another.

At this time, images are captured in a manner of partially overlapping imaging areas such that light reflected by one object is reflected in pixels of captured images in a plurality of continuous imaging areas in the present embodiment. That is, as shown in FIG. 25, when images are captured while continuously changing an imaging target distance from E1 to E2 to E3 . . . , increase amounts (E2–E1) and (E3–E2) of the imaging target distance are set to be smaller than an imaging target length F of an imaging area, thereby setting the increase amount of the imaging target distance in a manner in which the imaging areas change while partially overlapping with one another.

Figure 26:
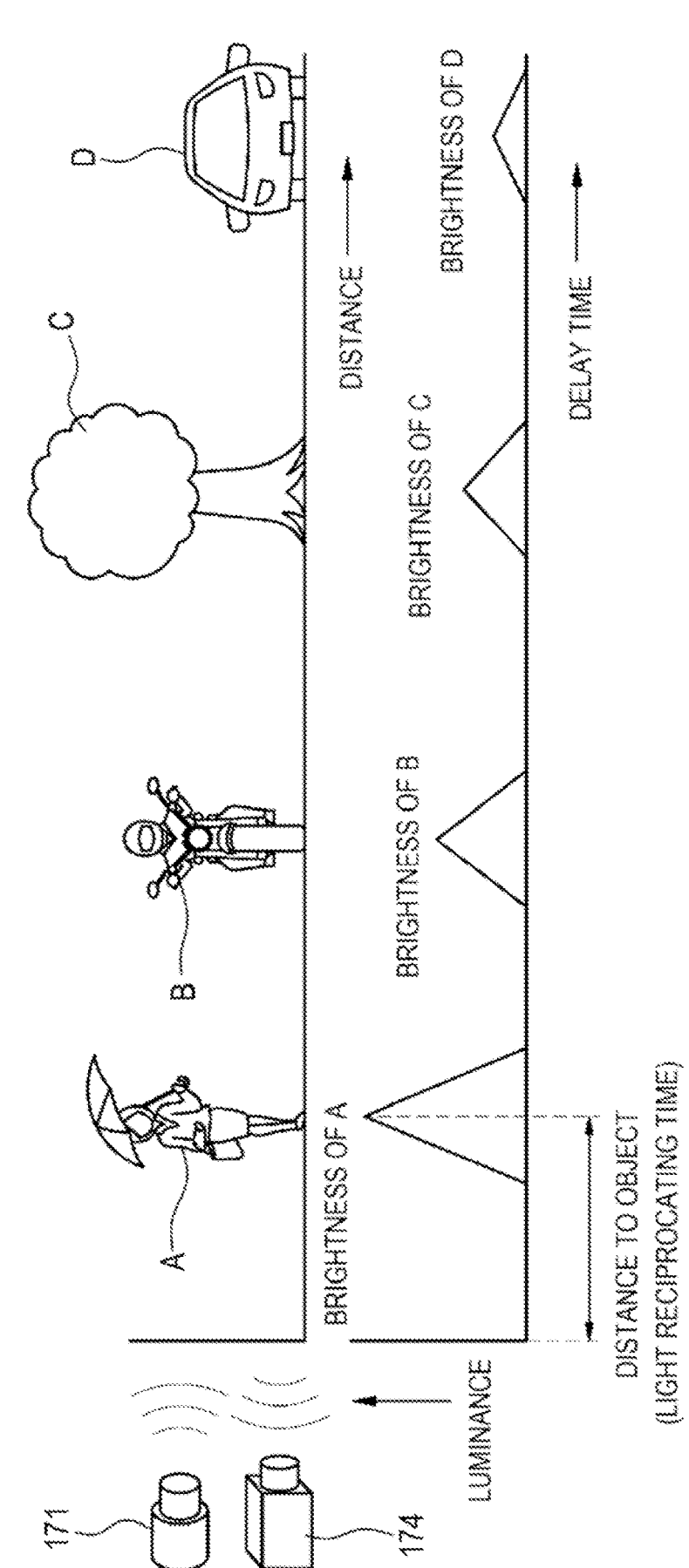
FIG. 26 is a schematic diagram showing temporal luminance changes of pixels corresponding to each object.

FIG. 26 shows temporal luminance changes of pixels corresponding to the respective objects A to D. By partially overlapping the imaging areas as described above, luminance values of a plurality of continuous captured images have a triangular wave characteristic in which the luminance values gradually increase, reach peaks at positions of the respective objects A to D, and then gradually decrease, as shown in FIG. 26. As described above, a luminance temporal change has a triangular wave shape by capturing an image in a manner in which light reflected from one object is included in a plurality of captured images. Therefore, detection accuracy of an object can be improved by setting an imaging area corresponding to a peak of the triangular wave shape as a distance from the vehicle 1 to each of the objects A to D.

Next, an example of processed images generated by processing a plurality of captured images acquired using the ToF method will be described with reference to FIGS. 27, 28A, and 28B.

Figure 27:
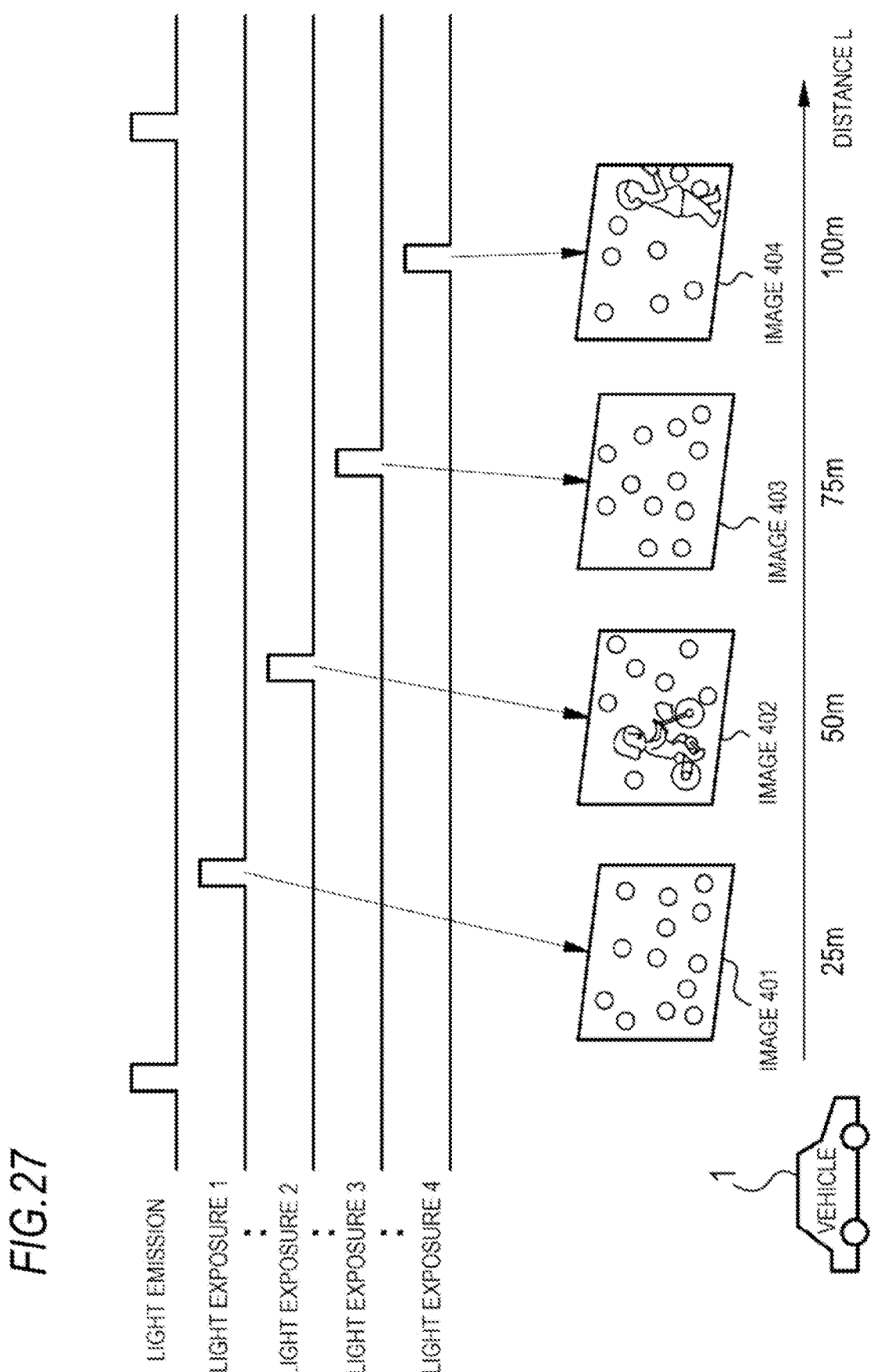
FIG. 27 is a diagram showing a light emission period, imaging timings, and captured images.

FIG. 27 is a diagram showing a light emission period of the light emitting unit 171, imaging timings of the image acquisition unit 174, and images captured at the respective imaging timings. FIG. 28A shows a camera image captured using a normal visible light camera, FIG. 28B shows a processed image generated based on the image shown in FIG. 27 captured using the ToF method.

As described above, the imaging target distance is obtained from "light speed×delay time tD/2". Therefore, captured images corresponding to different imaging target distances can be acquired by gradually changing the delay time tD. FIG. 27 shows, for example, images 401 to 404 captured at imaging timings of light exposures 1 to 4 among a plurality of images captured at different imaging timings. The image 401 is an image captured when a distance between the vehicle 1 and the target distance area, that is, the imaging target distance is 25 m. Similarly, the image 402 is an image captured when the imaging target distance is 50 m. The image 403 is an image captured when the imaging target distance is 75 m. The image 404 is an image captured when the imaging target distance is 100 m. In the present example, it is assumed that the vehicle 1 is traveling under bad weather of snowfall, and a condition of field of view is poor.

The image processing unit 146 of the sensor control unit 115 generates distance image data of each image based on the images 401 to 404 acquired by the image acquisition unit 174.

The object recognition processing unit 147 specifies an object (a person, an automobile, a sign, or the like) included in the distance image data using a pattern matching method. In the case of the present example, a child riding on a bicycle and snowfall are specified as objects in the distance image data of the image 402. A male walking and carrying with a smartphone and snowfall are specified as objects in the distance image data of the image 404. Snowfall is specified as an object in the distance image data of each of the image 401 and the image 403.

The determination unit 148 determines distance information, direction information, and the like of the object relative to the own vehicle (vehicle 1) for the object in each image specified by the object recognition processing unit 147.

The control unit 149 selects a predetermined image from the images 401 to 404 based on the distance information, the direction information, and the like that is related to the object and is determined by the determination unit 148. The selected image is an image including an object that needs to be accurately recognized as an object present in front of the vehicle 1. In the present example, the control unit 149 selects the image 402 including a child riding on a bicycle as an object and the image 404 including a male walking and carrying with a smartphone as an object. The control unit 149 generates a processed image as a captured image in front of the vehicle 1 based on the selected image. In the present example, the control unit 149 generates a processed image as shown in FIG. 28B by combining the image 402 and the image 404 that were selected.

Figure 28A:
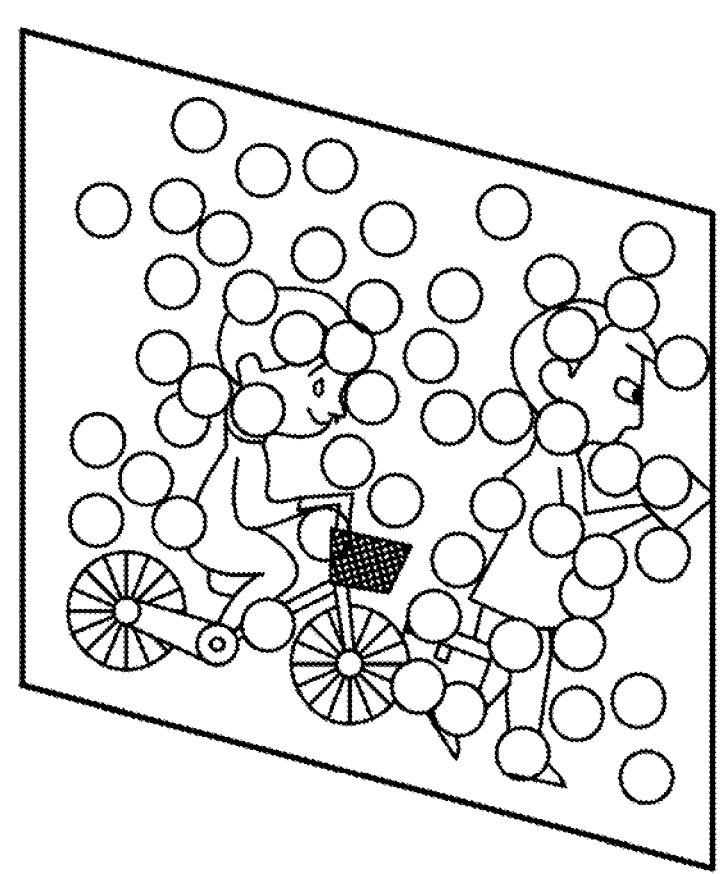
FIG. 28A is a view showing a camera image captured using a normal method.
Figure 28B:
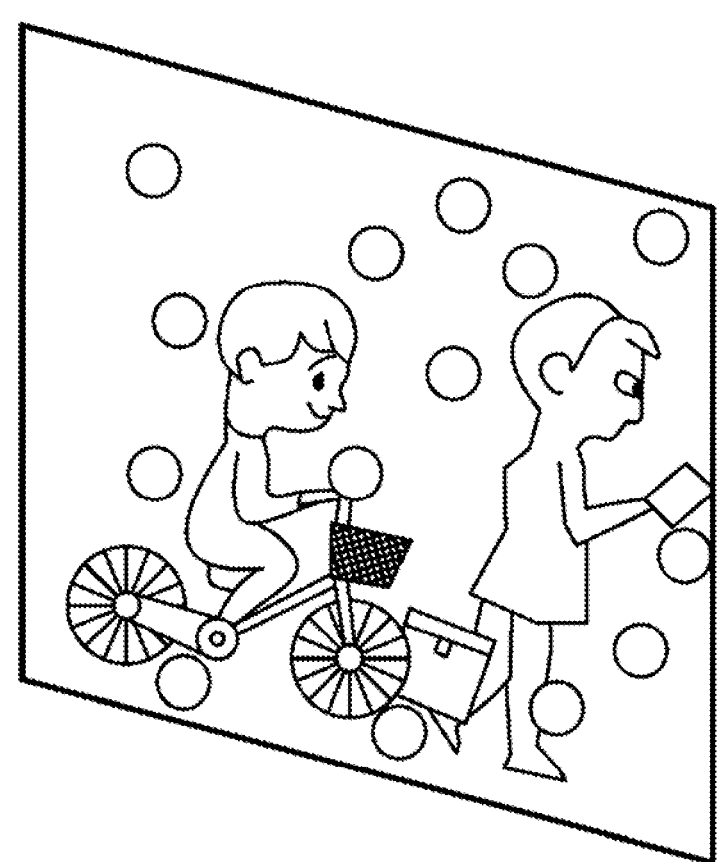
FIG. 28B is a view showing a processed image generated based on an image captured using a time of flight method.

In the case of a camera image captured by a normal visible light camera in a situation of bad weather of snowfall, the camera image becomes a captured image in which the field of view is poor due to snowfall and it is difficult to recognize the child riding on a bicycle or the man walking and carrying with a smartphone that needs to be accurately recognized as an object in front of the vehicle 1, as shown in FIG. 28A.

In contrast, according to the present embodiment, the control unit 149 can select only a necessary image from images captured using the ToF method and generate a processed image. Therefore, it is possible to generate an image capable of clearly recognizing the child riding on a bicycle or the man walking and carrying with a smartphone as an image acquired from the front infrared camera 406g, as shown in FIG. 28B.

Figure 29:
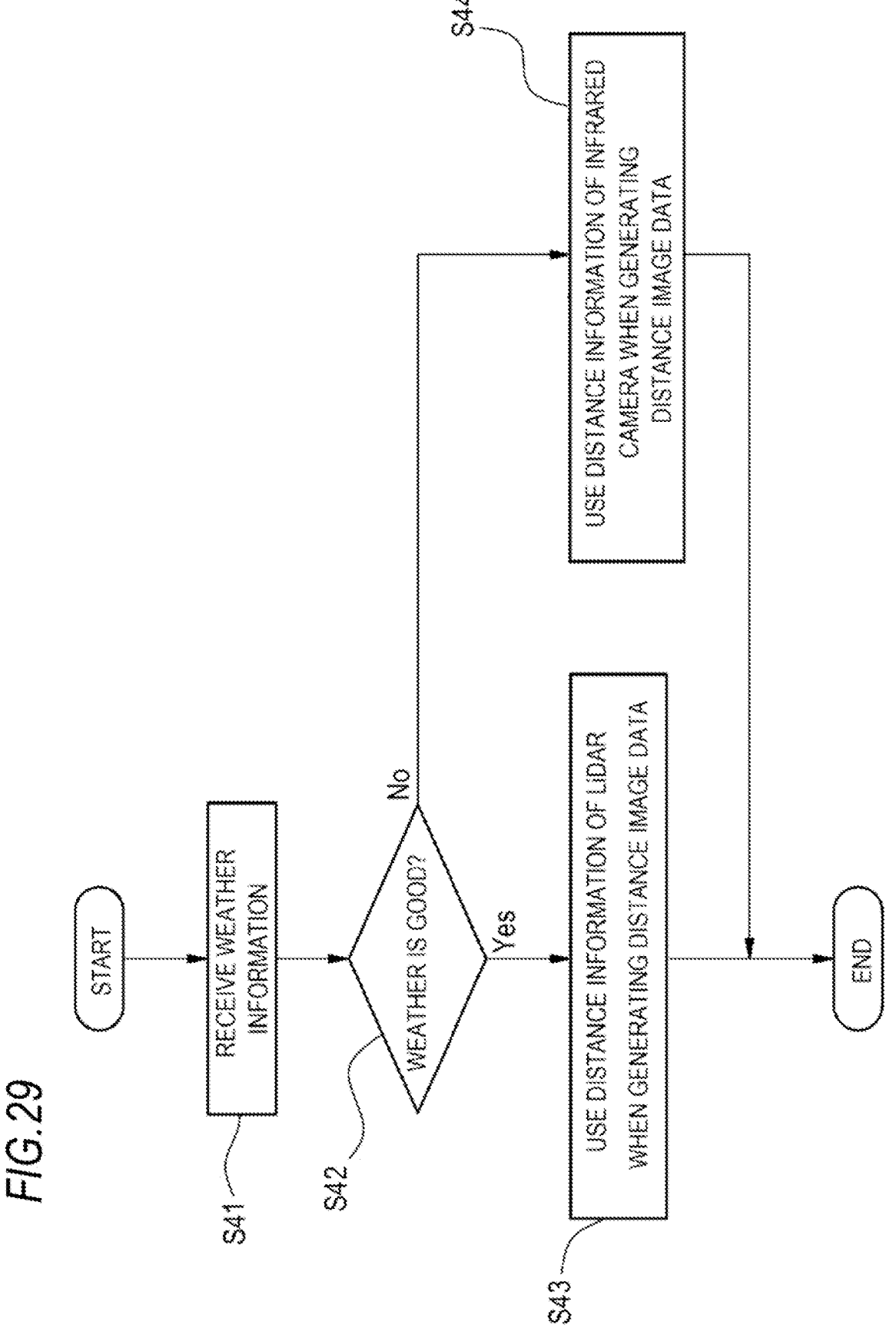
FIG. 29 is a flowchart showing an operation example of the sensor system shown in FIG. 19.

Next, an operation example of the sensor system 400 according to the present embodiment will be described with reference to FIG. 29. FIG. 29 is a flowchart showing an operation in a case where a distance image acquired by an infrared camera is appropriately processed in accordance with a weather condition.

First, in step S41, the sensor control unit 115 receives weather information detected by a weather sensor (an example of an external sensor) from the weather sensor. Next, in step S42, the sensor control unit 115 determines a weather condition around the vehicle 1 based on the received weather information.

In a case where it is determined in step S42 that the weather around the vehicle 1 is good (for example, not raining, no snowfall, or the like) (Yes in step S42), when the sensor control unit 115 generates distance image data that is related to an object around the vehicle and is acquired by the front infrared camera 406g using the ToF method, in step S43, the sensor control unit 115 generates the distance image data using distance information that is related to the object around the vehicle and is acquired by the front LiDAR 6f.

For example, the sensor control unit 115 receives distance information related to an object X present in front of the vehicle 1 from the front LiDAR 6f and the front infrared camera 406g, and when there is a difference in distance information received from the two sensors, the sensor control unit 115 selects a predetermined image for generating a processed image from a plurality of captured images (FIG. 27) captured using the ToF method, based on distance information that is related to the object X and is received from the front LiDAR 6f. That is, the sensor control unit 115 generates a processed image by complementing an image captured by the front infrared camera 406g with the distance information of the front LiDAR 6f. In a state where the weather is good, the accuracy of the distance information acquired by the front LiDAR 6f is often higher than the accuracy of the distance information acquired by the front infrared camera 406g. Therefore, when the weather around the vehicle 1 is good, accurate distance image data can be generated by complementing, the distance image data acquired by the front infrared camera 406g using the distance information acquired by the front LiDAR 6f. Therefore, highly accurate sensing can be achieved in the sensor system 400 including the front LiDAR 6f and the front infrared camera 406g.

On the other hand, in a case where it is determined in step S42 that the weather around the vehicle 1 is bad (No in step S42), when distance image data is generated by the front infrared camera 406g, in step S44, the sensor control unit 115 uses the distance information acquired by the front infrared camera 406g. The bad weather refers to a state in which the field of view is poor, such as raining, snowfall, or fog. In a state where the weather is bad, the accuracy of the distance information acquired by the front infrared camera 406g is often higher than the accuracy of the distance information acquired by the front LiDAR 6f. Therefore, it is possible to maintain the sensing quality even in a case of a weather condition (bad weather) in which the accuracy of the distance information acquired by the front LiDAR 6f is likely to decrease, by generating the distance image data using the distance information acquired by the front infrared camera 406g.

As described above, the front sensor unit 420f according to the fourth embodiment includes the front LiDAR 6f, the front infrared camera 406g, and the housing 121 that accommodates the front LiDAR 6f and the front infrared camera 406g. According to this configuration, it is possible to provide the front sensor unit 420f having a novel configuration in which the front LiDAR 6f and the front infrared camera 406g are integrated.

In the present embodiment, the front infrared camera 406g is a camera capable of capturing an image using the ToF method. Therefore, it is possible to appropriately acquire information outside the vehicle 1 even in bad weather by using the front infrared camera 406g adopting the ToF method. Since a function of a camera sensor in the related art is stopped when a condition of field of view is poor, an automatic driving function is stopped in bad weather, and the operation is entrusted to a driver. According to the present embodiment, it is possible to prevent the automatic driving function of the vehicle 1 from being stopped even in bad weather.

When the weather around the vehicle 1 is good, the sensor system 400 according to the present embodiment generates the distance image data by executing a complementing processing on the image captured by the front infrared camera 406g using the distance information acquired by the front LiDAR 6f. In a state where the weather is good, the accuracy of the distance information acquired by the front LiDAR 6f is often higher than the accuracy of the distance information acquired by the front infrared camera 406g. Therefore, it is possible to generate accurate distance image data using the distance information acquired by the front LiDAR 6f when the weather around the vehicle 1 is good.

According to the configuration of the present embodiment, it is possible to achieve highly accurate sensing in the sensor system 400 including the front LiDAR 6f and the front infrared camera 406g.

In the present embodiment, when the weather around the vehicle 1 is bad, the distance image data of the front infrared camera 406g is generated using the distance information acquired by the front infrared camera 406g. In a state where the weather is bad, the accuracy of the distance information acquired by the front infrared camera 406g is often higher than the accuracy of the distance information acquired by the front LiDAR 6f.

According to the configuration of the present embodiment, it is possible to maintain the sensing quality even in a case of a weather condition (bad weather) in which the accuracy of the distance information acquired by the front LiDAR 6f is likely to decrease.

In the present embodiment, the sensor system 400 is provided with the liquid cleaner 103A having the first liquid nozzle 131a that ejects the cleaning liquid toward the first area 123a corresponding to the front LiDAR 6f and the second liquid nozzle 131b that ejects the cleaning liquid toward the second area 123b corresponding to the front infrared camera 406g. Therefore, it is possible to maintain the cleanliness of the cleaning target surface of the sensor unit 120f in which the front infrared camera 406g and the front LiDAR 6f are integrated. In addition, it is possible to efficiently clean the cleaning target surface corresponding to the front infrared camera 406g and clean the cleaning target surface corresponding to the front LiDAR 6f.

When light emitted from the LiDAR is reflected by a transmission cover, an outer lens, or the like, the reflected light may be incident on the LiDAR and become stray light. In contrast, according to the sensor unit 120f in the present embodiment, the transmission cover 123 is attached in a manner of extending in an inclined direction relative to a plane orthogonal to the optical axis of the front LiDAR 6f accommodated in the housing 121. Therefore, it is possible to reduce an amount of light that is emitted from the front LiDAR 6f and the front infrared camera 406g, is reflected by the transmission cover 123, and is incident on the front LiDAR 6f and the front infrared camera 406g. Therefore, it is possible to prevent the reflected light from affecting the measurement of the front LiDAR 6f and the front infrared camera 406g.

In the present embodiment, the transmission cover 123 is attached in a manner of being inclined toward the inner side of the housing 121 from the upper direction to the lower direction. Therefore, it is possible to prevent external light (in particular, sunlight) from being incident on the transmission cover 123 from above and outside the housing 121. Therefore, it is possible to prevent external light such as sunlight from affecting the front LiDAR 6f and the front infrared camera 406g.

In the present embodiment, the cleaner control unit 113 that controls the liquid cleaner 103A and the air cleaner 103B is integrally attached to the housing 121. As a result, control functions of the liquid cleaner 103A and the air cleaner 103B are also integrated with the sensor unit 120f, so that a load of the vehicle control unit 3 that is a vehicle ECU can be reduced.

According to the sensor unit 420f, it is easy to improve positioning accuracy of the liquid cleaner 103A and the air cleaner 103B relative to the front LiDAR 6f and the front infrared camera 406g by forming the front LiDAR 6f and the front infrared camera 406g as an integrated unit. When the sensor unit 420f is to be mounted on the vehicle 1, the front LiDAR 6f, the front infrared camera 406g, and the cleaner unit 110 that cleans the front LiDAR 6f and the front infrared camera 406g can be incorporated together, and it is easy to assemble the sensor unit 420f to the vehicle 1.

Although the embodiment of the present invention has been described above, it is needless to say that the technical scope of the present invention should not be interpreted as being limited to the description of the present embodiment. It is to be understood by those skilled in the art that the present embodiment is merely an example and various modifications may be made within the scope of the invention described in the claims. The technical scope of the present invention should be determined based on the scope of the inventions described in the claims and an equivalent scope thereof.

Although an example in which a sensor system including a sensor unit and the like is mounted on a vehicle that can be driven automatically has been described in the embodiment described above, the sensor system may be mounted on a vehicle that cannot be driven automatically.

Although the liquid cleaner 103A that ejects the cleaning liquid is attached to the upper portion of the housing 121 in the embodiment described above, the present invention is not limited thereto. For example, an air cleaner that ejects air may be attached to an upper portion of the housing 121. Similar to the liquid cleaner 103A, the air cleaner can clean the first area 123a and the second area 123b at the same time. In this case, a cleaner attached to a side portion of the housing 121 may be a liquid cleaner. According to this configuration, a cleaning liquid or air suitable as a cleaning medium can be selected and used.

The cleaning liquid ejected from the liquid cleaner 103A of the sensor unit 120f contains water or a detergent. Cleaning media ejected to the front and rear windows 1f and 1b, the head lamps 7r and 7l, the LiDARs 6f, 6b, 6r, and 6l, and the cameras 6c, 6g, 6m, and 6s may be different from one another or may be the same.

The present application is based on Japanese Patent Application NO. 2019-192595 filed on Oct. 23, 2019, Japanese Patent Application NO. 2019192596 filed on Oct. 23, 2019, Japanese Patent Application NO. 2019-192597 filed on Oct. 23, 2019, Japanese Patent Application NO. 2019-192598 filed on Oct. 23, 2019, Japanese Patent Application NO. 2019-195180 filed on Oct. 28, 2019, Japanese Patent Application NO. 2019-199532 filed on Nov. 1, 2019, and Japanese Patent Application NO. 2019-199533 filed on Nov. 1, 2019, the contents of which are incorporated herein by reference.

The invention claimed is:

1. A sensor system to be mounted on a vehicle, the sensor system comprising:

a LiDAR;

a camera;

a housing that accommodates the LiDAR and the camera; and a cleaner that is attached to the housing and has at least one nozzle configured to clean a first cleaning target surface corresponding to the LiDAR and a second cleaning target surface corresponding to the camera at the same time using a cleaning medium, wherein the first cleaning target surface and the second cleaning target surface are surfaces of a transmission cover attached to an opening of the housing, wherein the transmission cover is formed in a manner of extending in an inclined direction toward an inner side of the housing from an upper direction toward a lower direction.

2. The sensor system according to claim 1, wherein a filter that shields visible light is provided on the first cleaning target surface of the transmission cover.

3. The sensor system according to claim 1, further comprising:

a cleaner control unit configured to control the cleaner, wherein the cleaner control unit is integrally attached to the housing.

4. The sensor system according to claim 1, wherein the cleaner has a first nozzle configured to eject the cleaning medium toward the first cleaning target surface, and a second nozzle configured to eject the cleaning medium toward the second cleaning target surface.

5. The sensor system according to claim 1, wherein the cleaning medium is at least one of a cleaning liquid and air.

6. The sensor system according to claim 1, wherein the housing includes a triangle-shaped protruding portion that protrudes outward in at least one of left and right directions of the transmission cover.

7. The sensor system according to claim 6, wherein the at least one air nozzle is disposed at the protruding portion.

8. A sensor unit to be mounted on a vehicle, the sensor unit comprising:

a LiDAR;

a camera;

a housing that accommodates the LiDAR and the camera;

a liquid cleaner that has at least one liquid nozzle configured to clean a cleaning target surface corresponding to the LiDAR and the camera using a cleaning liquid;

a transmission cover that is provided in a manner of covering an opening of the housing and is configured as the cleaning target surface, wherein the transmission cover is formed in a manner of being directed toward an inner side of the housing from an upper direction toward a lower direction; and an air cleaner that has at least one air nozzle configured to clean the cleaning target surface using air, wherein the liquid cleaner is attached to an upper portion of the housing, and wherein the air cleaner is attached to a side portion of the housing.

9. The sensor unit according to claim 8, wherein the housing includes a protruding portion that protrudes outward in at least one of left and right directions of the transmission cover, and wherein the at least one air nozzle is disposed at the protruding portion.

10. The sensor system according to claim 9, wherein the protruding portion is in the shape of a triangle.

11. The sensor unit according to claim 10, wherein a filter that shields visible light is provided on a surface of the transmission cover corresponding to the LiDAR.

12. The sensor unit according to claim 8, further comprising:

a cleaner control unit configured to control the liquid cleaner and the air cleaner, wherein the cleaner control unit is integrally attached to the housing.

13. The sensor unit according to claim 8, wherein the liquid cleaner has a first nozzle configured to eject the cleaning liquid toward an area of the cleaning target surface through which light emitted from the LiDAR passes, and a second nozzle configured to eject the cleaning liquid toward an area of the cleaning target surface corresponding to a lens of the camera.

14. A sensor system to be mounted on a vehicle, the sensor system comprising:

a first sensor;

a second sensor;

a housing that accommodates the first sensor and the second sensor;

a cleaner that has at least one nozzle configured to clean a first cleaning target surface corresponding to the first sensor and a second cleaning target surface corresponding to the second sensor using a cleaning medium;

a transmission cover that is provided in a manner of covering an opening of the housing and is configured as the first cleaning target surface and the second cleaning target surface, wherein the transmission cover is formed in a manner of being directed toward an inner side of the housing from an upper direction toward a lower direction; and a cleaner control unit configured to control the cleaner, wherein the cleaner control unit controls the cleaner to clean the first cleaning target surface and the second cleaning target surface based on dirt information detected by at least one of the first sensor and the second sensor.

15. The sensor system according to claim 14,
wherein the first sensor is a LiDAR,
wherein the second sensor is a camera, and
wherein the dirt information is detected based on point cloud data acquired by the LiDAR.

16. The sensor system according to claim 15,
wherein the cleaner control unit controls the cleaner to clean the first cleaning target surface and the second cleaning target surface when a missing degree of the point cloud data is equal to or larger than a predetermined threshold.

17. The sensor system according to claim 14,
wherein the first sensor is a LiDAR,
wherein the second sensor is a camera, and
wherein the dirt information is detected based on image data acquired by the camera.

18. The sensor system according to claim 14, further comprising:
a sensor control unit configured to detect the dirt information,
wherein the cleaner control unit and the sensor control unit are integrally attached to the housing.

19. The sensor system according to claim 14,
wherein the housing includes a triangle-shaped protruding portion that protrudes outward in at least one of left and right directions of the transmission cover.

20. The sensor system according to claim 19,
wherein the at least one air nozzle is disposed at the protruding portion.

* * * * *